US009538157B2

(12) United States Patent
Piestun et al.

(10) Patent No.: US 9,538,157 B2
(45) Date of Patent: *Jan. 3, 2017

(54) METHODS AND SYSTEMS FOR THREE DIMENSIONAL OPTICAL IMAGING, SENSING, PARTICLE LOCALIZATION AND MANIPULATION

(71) Applicant: The Regents of the University of Colorado, a body corporate, Denver, CO (US)

(72) Inventors: Rafael Piestun, Boulder, CO (US); Sean Albert Quirin, Longmont, CO (US)

(73) Assignee: THE REGENTS OF THE UNIVERSITY OF COLORADO, A BODY CORPORATE, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/465,543

(22) Filed: Aug. 21, 2014

(65) Prior Publication Data

US 2015/0035946 A1    Feb. 5, 2015

Related U.S. Application Data

(63) Continuation of application No. 14/031,887, filed on Sep. 19, 2013, which is a continuation of application
(Continued)

(51) Int. Cl.
| | | |
|---|---|---|
| *G06K 9/00* | (2006.01) | |
| *H04N 13/02* | (2006.01) | |
| *G06T 7/00* | (2006.01) | |

(52) U.S. Cl.
CPC ......... *H04N 13/0203* (2013.01); *G06T 7/0048* (2013.01); *G06T 2207/10056* (2013.01); *G06T 2207/10064* (2013.01)

(58) Field of Classification Search
CPC .................................................. H04N 13/0203
(Continued)

(56) References Cited

U.S. PATENT DOCUMENTS

| 3,054,898 A | 9/1962 | Westover et al. |
|---|---|---|
| 3,597,083 A | 8/1971 | Fraser |

(Continued)

OTHER PUBLICATIONS

Marim et al: "Improving single particle localization with an empirically calibrated Gaussian kernel", IEEE, 2008.*
(Continued)

*Primary Examiner* — Ruiping Li
(74) *Attorney, Agent, or Firm* — Maschoff Brennan

(57) ABSTRACT

Embodiments include methods, systems, and/or devices that may be used to image, obtain three-dimensional information from a scene, and/or locate multiple small particles and/or objects in three dimensions. A point spread function (PSF) with a predefined three dimensional shape may be implemented to obtain high Fisher information in 3D. The PSF may be generated via a phase mask, an amplitude mask, a hologram, or a diffractive optical element. The small particles may be imaged using the 3D PSF. The images may be used to find the precise location of the object using an estimation algorithm such as maximum likelihood estimation (MLE), expectation maximization, or Bayesian methods, for example. Calibration measurements can be used to improve the theoretical model of the optical system. Fiduciary particles/targets can also be used to compensate for drift and other type of movement of the sample relative to the detector.

19 Claims, 23 Drawing Sheets

Related U.S. Application Data

No. 13/084,345, filed on Apr. 11, 2011, now Pat. No. 8,620,065.

(60) Provisional application No. 61/322,526, filed on Apr. 9, 2010, provisional application No. 61/352,716, filed on Jun. 8, 2010.

(58) Field of Classification Search
USPC .......................................... 382/154, 274–275
See application file for complete search history.

(56) References Cited

U.S. PATENT DOCUMENTS

| | | | |
|---|---|---|---|
| 3,901,595 A | 8/1975 | Helava et al. | |
| 3,961,851 A | 6/1976 | Gerharz | |
| 4,178,090 A | 12/1979 | Marks et al. | |
| 4,573,191 A | 2/1986 | Kidode et al. | |
| 4,794,550 A | 12/1988 | Greivenkamp, Jr. | |
| 4,825,263 A | 4/1989 | Desjardins et al. | |
| 4,843,631 A | 6/1989 | Steinpichler et al. | |
| 5,076,687 A | 12/1991 | Adelson | |
| 5,102,223 A | 4/1992 | Uesugi et al. | |
| 5,193,124 A | 3/1993 | Subbarao | |
| 5,243,351 A | 9/1993 | Rafanelli et al. | |
| 5,337,181 A | 8/1994 | Kelly | |
| 5,521,695 A | 5/1996 | Cathey, Jr. et al. | |
| 6,344,893 B1 | 2/2002 | Mendlovic et al. | |
| 6,969,003 B2 | 11/2005 | Havens et al. | |
| 7,342,717 B1 | 3/2008 | Hausmann et al. | |
| 2003/0061035 A1 | 3/2003 | Kadambe | |
| 2005/0057744 A1 | 3/2005 | Pohle et al. | |
| 2006/0126921 A1 | 6/2006 | Shorte et al. | |
| 2007/0268366 A1 | 11/2007 | Raskar et al. | |
| 2008/0137059 A1* | 6/2008 | Piestun .................... | G01C 3/08 356/4.01 |
| 2011/0002530 A1 | 1/2011 | Zhuang et al. | |

OTHER PUBLICATIONS

Aguet, Francois et al., "A Maximum-Likelihood Formalism for Sub-Resolution Axial Localization of Fluorescent Nanoparticles," Optics Express, vol. 13, No. 26, Dec. 26, 2005, 20 pgs.

Chasles, F. et al., "Full-Field Optical Sectioning And Three-Dimensional Localization of Fluorescent Particles Using Focal Plane Modulation," Optics Letters, vol. 31, No. 9, May 1, 2006, 3 pgs.

Dowski, Jr., Edward R. et al., "Single-Lens Single-Image Incoherent Passive-Ranging Systems," Applied Optics, vol. 33, No. 29, Oct. 10, 1994, 12 pgs.

Greengard, Adam et al., "Depth From Diffracted Rotation," Optics Letters, vol. 31, No. 2, Jan. 15, 2006, 3 pgs.

Greengard, Adam et al., "Depth From Rotating Point Spread Functions," Proceedings of SPIE, vol. 5557, 2004, 7 pgs.

Greengard, Adam et al., "Fisher Information of 3D Rotating Point Spread Functions," Computational Optical Sensing and Imaging Presentation, Jun. 6, 2005, 31 pages.

Johnson, Gregory E. et al., "Passive Ranging Through Wave-Front Coding: Information And Application," Applied Optics, vol. 39, No. 11, Apr. 10, 2000, 11 pgs.

Juette, "Three-dimensional sub-1 00 nm resolution fluorescence microscopy of thick samples," 2008, Nat Methods 5: 3 pgs.

Kao, H. Pin et al., "Tracking of Single Fluorescent Particles in Three Dimensions: Use Of Cylindrical Optics To Encode Particle Position," Biophysical Journal, vol. 67, Sep. 1994, 10 pgs.

Pavani, et al., "Three-dimensional, single-molecule fluorescence imaging beyond the diffraction limit by using a double-helix point spread function", PNAS, Mar. 3, 2009, and online published, Feb. 11, 2009, 5 pgs.

Pavani et al., "Three dimensional tracking of fluorescent microparticles using a photon-limited double-helix response system", Optics Express, 2008, 10 pgs.

Pentland, Alex Paul, "A New Sense for Depth of Field," IEEE Transactions on Pattern Analysis and Machine Intelligence, vol. PAMI-9, No. 4, Jul. 1987, 9 pgs.

Piestun, Rafael et al., "Wave Fields in Three Dimensions: Analysis And Synthesis," J. Opt. Soc. Am. A., vol. 13, No. 9, Sep. 1996, 12 pgs.

Sirat, Gabriel Y., "Conoscopic Holography. I. Basic Principles and Physical Basis," J. Opt. Soc. Am. A, vol. 9, No. 1, Jan. 1992, 14 pgs.

Subbarao, Murali et al., "Analysis of Defocused Image Data for 3D Shape Recovery Using a Regularization Technique," SPIE, vol. 3204, 1997, 12 pgs.

Thomann et al., "Automatic fluorescent tag detection in 30 with super-resolution: application to analysis of chromosome movement", J. of Microscopy, 2002, 16 pgs.

\* cited by examiner

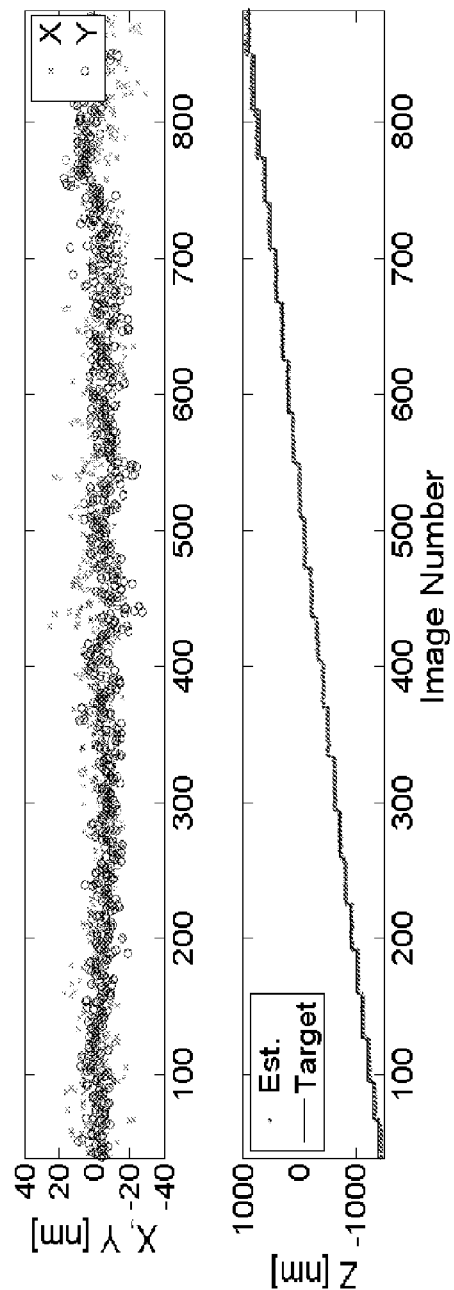
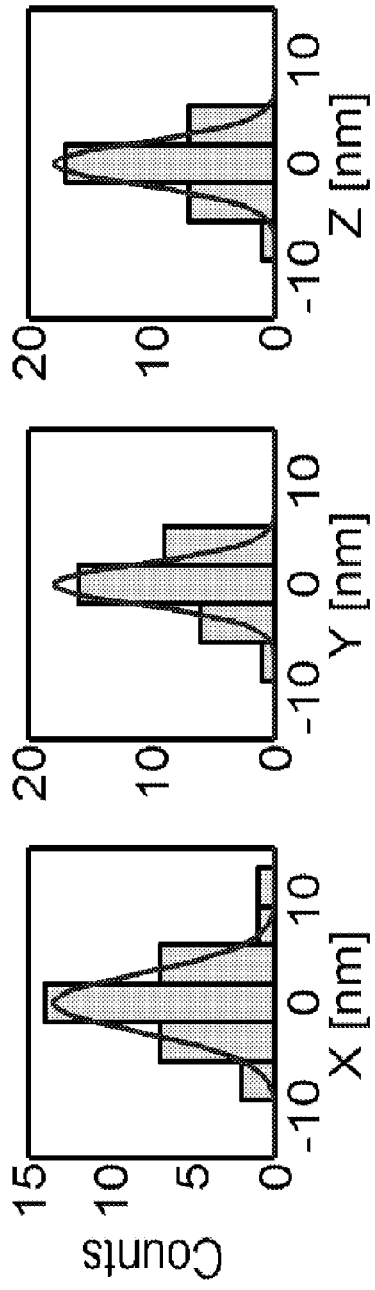
FIG. 4A
FIG. 4B

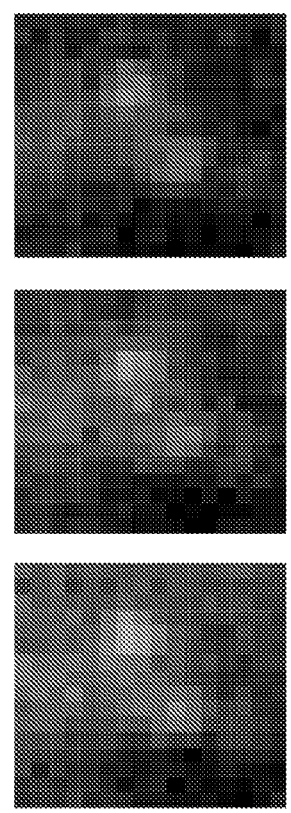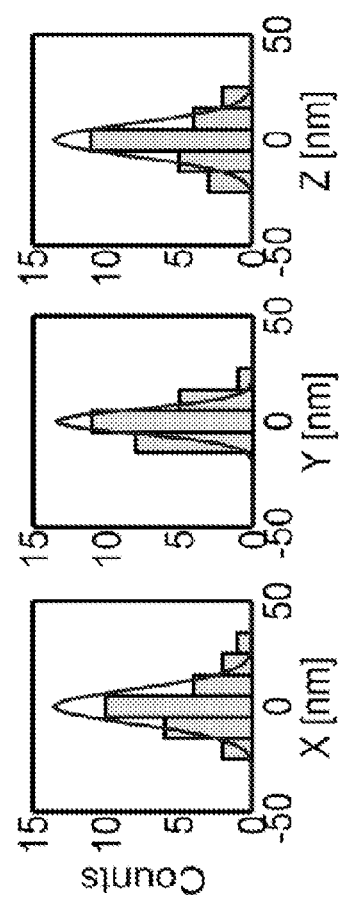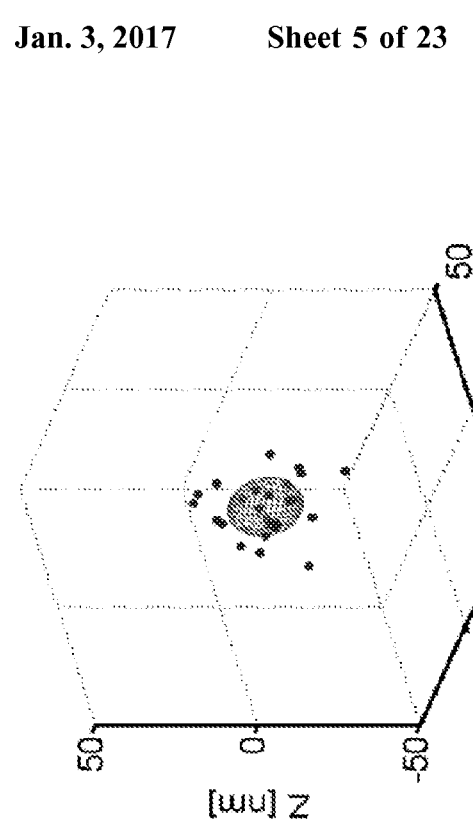
FIG. 5A
FIG. 5B
FIG. 5C

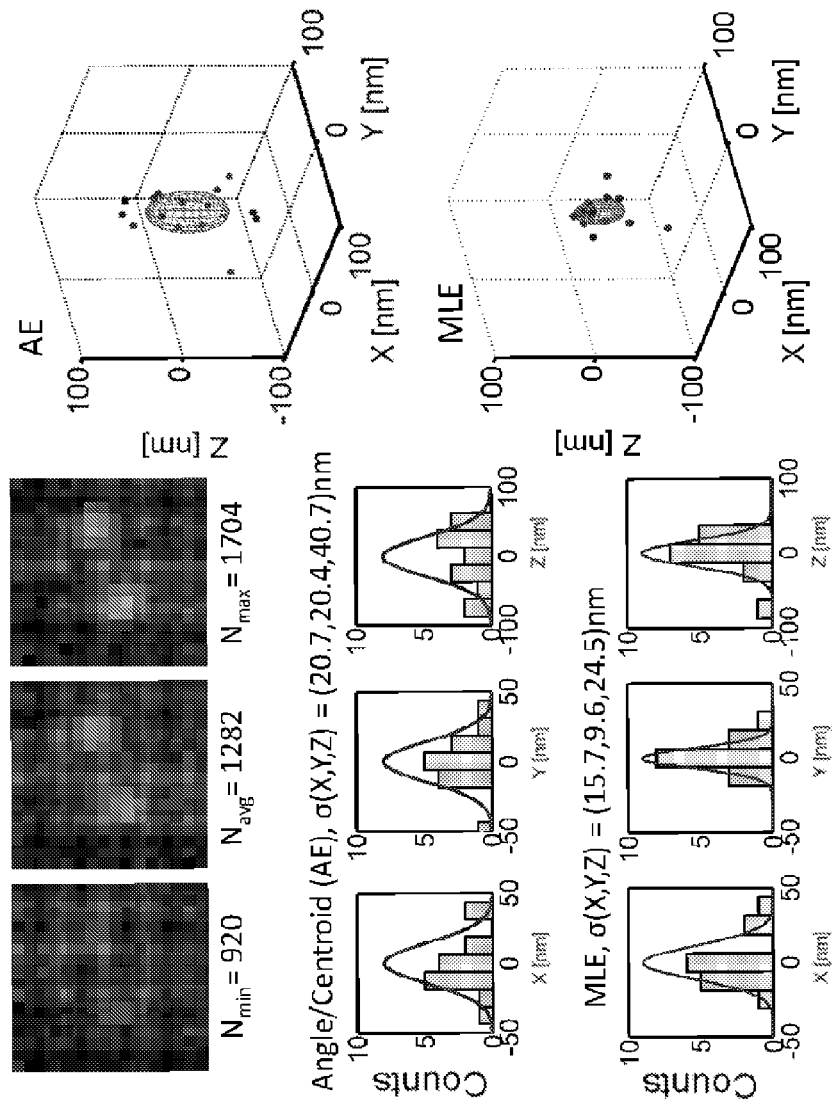

CE volume is 4.78x larger than MLE uncertainty volume. The three images are representative of the fewest, average and most photon images. $\sigma_{mle}$ = (15.3, 9.0, 26.0) nm, $\sigma_{ce}$ = (20.7, 20.4, 40.7) nm.

METHODS AND SYSTEMS FOR THREE DIMENSIONAL OPTICAL IMAGING, SENSING, PARTICLE LOCALIZATION AND MANIPULATION

GOVERNMENT LICENSE RIGHTS

This invention was made with government support under grant numbers 0082885 and 0801680 awarded by the National Science Foundation. The government has certain rights in the invention.

TECHNICAL FIELD

Various embodiments of the present invention generally relate to systems and methods for 3D imaging and sensing as well as 3D localization with optimal procedures, some of which are applicable in photo-activation localization microscopy and stochastic optical reconstruction microscopy. More specifically, some embodiments relate to systems and methods for precise particle position estimation in 3D that provide an increased resolution for a given number of photons detected and reduced data acquisition time for a given target resolution. Some embodiments also relate to the retrieval of 3D information from images at any scale, macroscopic or microscopic.

BACKGROUND

The use of digital devices to collect and store irradiance patterns representative of the scene has provided a convenient means for storing and processing images. Consequently image processing algorithms are increasingly used to decode the sampled patterns into a form conveying the most relevant information to the user. Examples include but are not limited to using algorithms to remove optical aberrations and extract depth information encoded into the collected irradiance pattern. For improved results from post-processing, the imaging system has evolved into functionally encoded optics (both light collection and illumination) to enhance the information extraction capacity for parameters relevant for the user. Such designs may incorporate the use of aberrations, such as defocus for example, to enhance the encoding of 3D information as the shape/size/position/orientation/rotation of an object.

Previous implementations for realizing 3D in-focus imaging have focused on modification of the optical system point spread function (PSF) such that it is constant with the axial position of the object. Post-processing algorithms are implemented to solve the inverse problem which estimates the original object from the device image and invariant PSF. Such systems have required a trade-off between axial invariance and suppression of the spatial frequency content and hence loss of restoration quality in the MTF. Alternatively, restoration quality can be strongly dependent upon the spatial frequency due to optical encoding MTFs which are not rotationally symmetric for example.

Both classical lenses and the axial invariant solutions implemented are by definition ill-suited for axial ranging or three dimensional imaging and sensing. Axial ranging requires that the optical PSF be designed to change rapidly as a function of axial location of the object. Given an image with a highly axially variant PSF, the 3D position of the object may be efficiently encoded for estimation in the post-processing algorithm. Point spread functions designed for three dimensional imaging have therefore been ill-suited for extended depth of field.

Previous implementations have focused on either particular application despite the need for all information to be collected simultaneously. There is thus a need for optical system designs with matched post-processing algorithms which can generate images without the presence of defocus as well as provide a three dimensional estimation of the scene.

Photo-activation localization microscopy provides far-field super-resolution imaging techniques based on the periodic photoactivation or photoswitching of the fluorescence emission of sparse arrays of molecules, followed by localization with sub-diffraction limit precision that allows the generation of super-resolution images molecule-by-molecule. This group of techniques may be known under the acronyms STORM (Stochastic Optical Reconstruction Microscopy), PALM (Photo-Activated Localization Microscopy), and variants. Several methods for the generation of three-dimensional images have been demonstrated in traditional systems. However, the resolution of these techniques are not as fine as desired.

There is also a significant current interest in decreasing the data acquisition time by engineering new fluorescent proteins and organic fluorophores along with optical improvements in photon collection. Significant efforts are also underway to reduce systematic errors such as vibrations, drift, and imperfections of the detector, as well as asymmetric molecular emission. Nevertheless, the newly discovered frontiers of optical resolution and functionality—such as quantitative tracking and distance measurement—have not been fully realized yet.

There is also a need for tools and techniques to improve the resolution of photo-activation location microscopy.

SUMMARY

Various embodiments of the present invention generally relate to the use of the shape of the three dimensional pattern of light waves for an enhanced signal to be used for direct measurements or later reconstruction using digital algorithms in digital imaging, sensing or manipulation of objects (from single molecule to macroscopic in scale) located within a volume. One class of 3D point spread function are the spinning point spread functions which are an improvement on methods which demonstrated axial ranging and three dimensional imaging—including simultaneous combinations thereof to provide an 3D image in focus over a wide depth range.

The optical coding scheme of three dimensional scenes imaged onto a digital device or projected into a volume is disclosed. The optical encoding modifies the Point Spread Function of the optical device to consist of a prominent peak or pattern which spins about an axis as it is propagated axially. In an image capture device, the resulting image(s) may be post-processed to generate both a depth map and a restored image (i.e. without the effects of defocus). Alternatively, the image may be used for 3D localization of particles or objects. The PSF may be also projected into a volume to functionally manipulate, trap, etc. matter in a fashion consistent with the shape.

This invention also related to the use of multiple channels with different or equal 3D PSFs to perform the abovementioned tasks.

Embodiments include methods, systems, and devices that may be used to locate multiple small particles in three dimensions using embodiments of an imaging system. More specifically, various embodiments use tools and techniques to estimate the position of molecules using a Phase Retrieval (PR) enabled Maximum Likelihood Estimator (MLE) that may be used to search the object space for a match with the experimental image. This estimator may approach the lower bound on precision for unbiased estimators of the molecule position. In accordance with various embodiments, PR-enabled MLE using a DH-FPALM microscope may result in a three-dimensional wide-field super-resolved image.

Particles are typically smaller than the diffraction limit of the imaging optics. Some embodiments use a point spread function (PSF) with a predefined three dimensional shape to obtain high Fisher information in 3D. The PSF may be generated via a phase mask, an amplitude mask, a hologram, or a diffractive optical element, merely by way of example. Small particles may be imaged using the 3D PSF. The images may be used to find the precise location of the particles using an estimation algorithm such as maximum likelihood estimation (MLE), expectation maximization, or Bayesian methods, for example. Calibration measurements can be used to improve the theoretical model of the optical system. Fiduciary particles can also be used to compensate for drift and other type of movement of the sample relative to the detector.

In some embodiments, the estimation process may involve an accurate model of the 3D PSF. A set of measurements of the PSF for different particle locations can be measured. In addition, interpolation among these calibration images can be performed. In some embodiments, the interpolation may be performed using phase retrieval algorithms. A model of the noise such as Poisson, Gaussian, for example, may also be involved.

In accordance with embodiments of the present invention, PSF can be any 3D PSF, for example, a double-helix PSF may be used. Sampling of the PSF for calibration could be denser, sparser, or even non-existing in some embodiments. In the first case, interpolation might not be needed. In the latter case, the theoretical model could be used.

In some embodiments, interpolation of the calibration data can be performed using other methods than phase retrieval.

In some embodiments, MLE may be used, but other estimation procedures can be implemented. Bias or unbiased estimation may also be used in various embodiments.

Various embodiments of the systems and methods can be applied to fluorescent particles and single molecules (PA-GFP). The methods may apply to, but are not limited to, other fluorescent particles such as dyes and quantum dots. They may apply also, for example, to scattering particles, or emission/radiation/reflection from small regions of an object due to the illumination with a laser or other light source, such as in scanning systems.

Some embodiments provide shaping the three dimensional pattern of light waves for an enhanced signal to be used for direct measurements or later reconstruction using digital algorithms in digital imaging, sensing or manipulation of objects located with a volume. Still yet, some embodiments can use spinning point spread functions which are an improvement on methods which demonstrated axial ranging and three dimensional imaging—including simultaneous combinations thereof to provide a 3D image in-focus over a wide depth range.

The optical coding scheme of three dimensional scenes imaged onto a digital device or projected into a volume are also disclosed. The optical encoding according to various embodiments modifies the Point Spread Function of the optical device to consist of a prominent peak or pattern which spins about an axis as it is propagated axially. In an image capture device, the resulting image(s) may be post-processed to generate both a depth map and a restored image (i.e. without the effects of defocus). Alternatively, the PSF may be projected into a volume to functionally manipulate, trap, etc. matter in a fashion consistent with the shape.

BRIEF DESCRIPTION OF THE DRAWINGS

Embodiments of the present invention will be described and explained through the use of the accompanying drawings in which:

FIGS. 4A-4B illustrate calibration data from florescent bead sources in accordance with at least one embodiment of the present invention;

FIGS. 5A-5C illustrate experimental estimation performance of signal molecule localization in accordance with various embodiments of the present invention;

FIGS. 9A-9E illustrate the comparison of a primitive 3D position estimator relative to the performance of a 3D position estimator representative of embodiments of the present invention;

Figure 18:
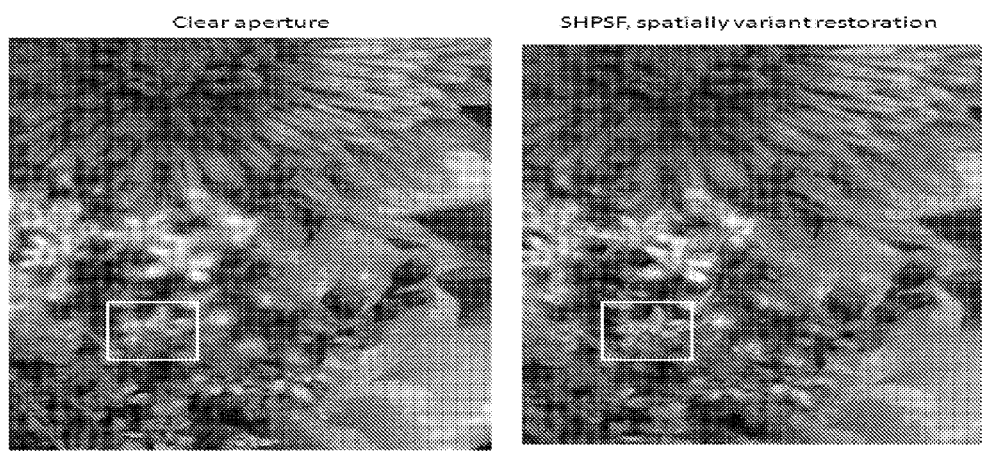
Figure 19:
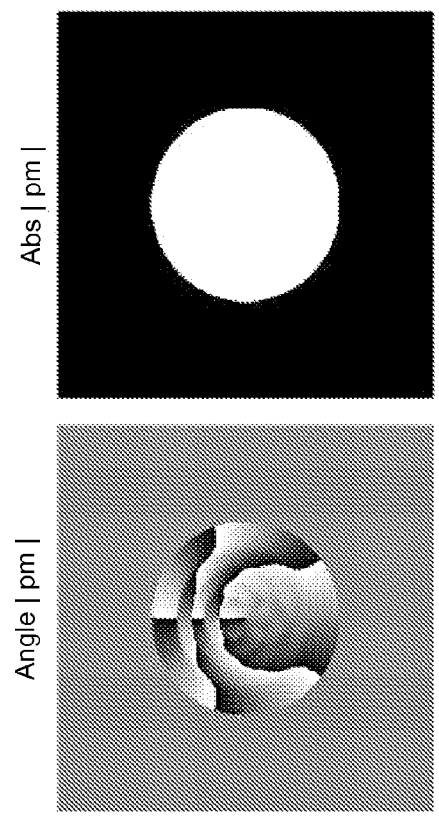
Figure 20:
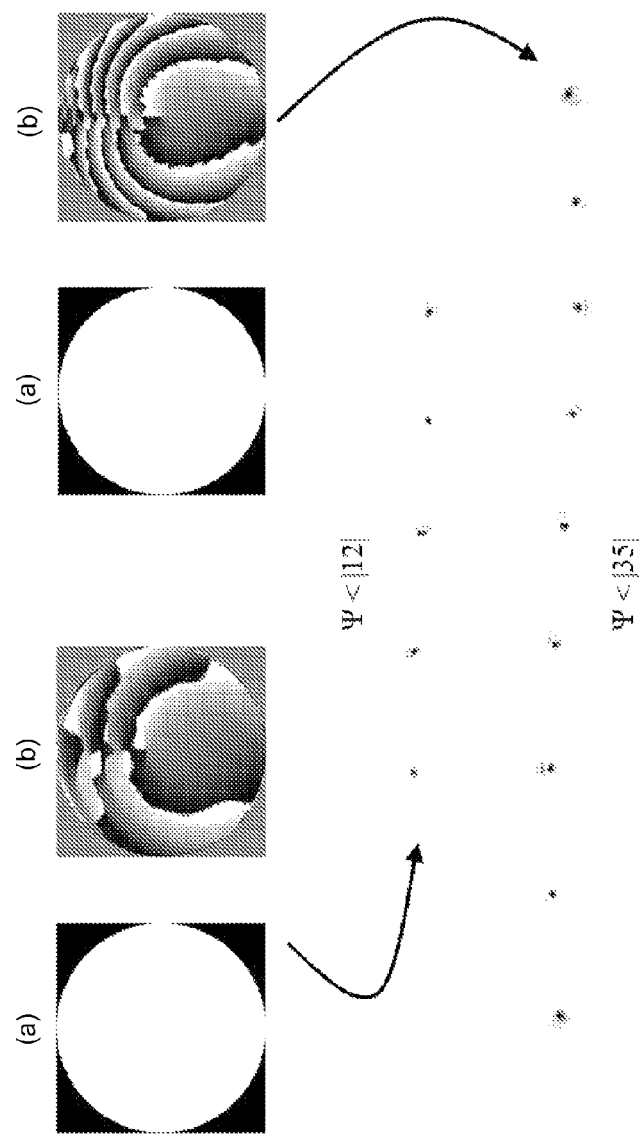
Figures 21A, 21B:
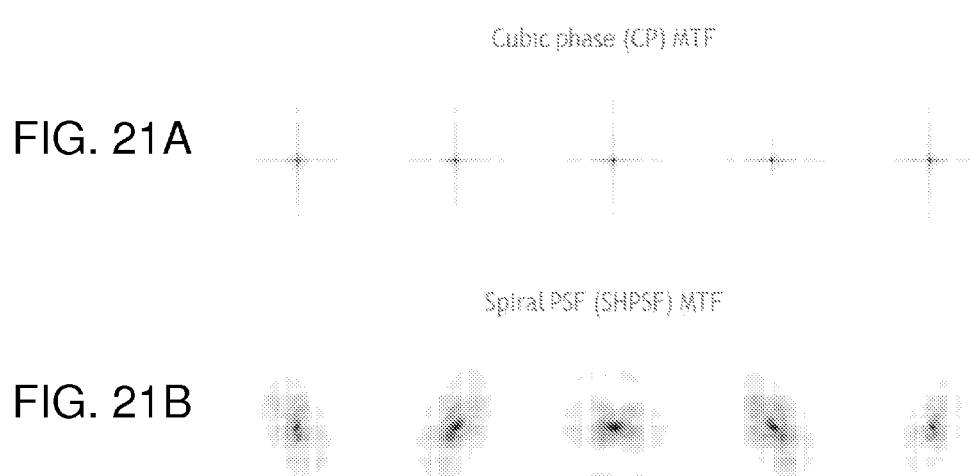
Figure 22:
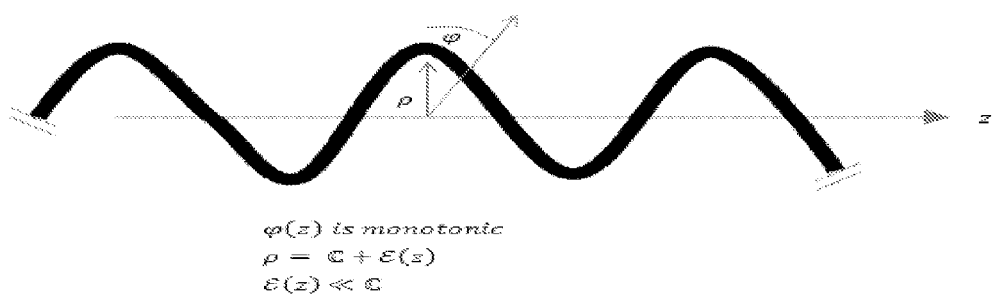
Figure 23:
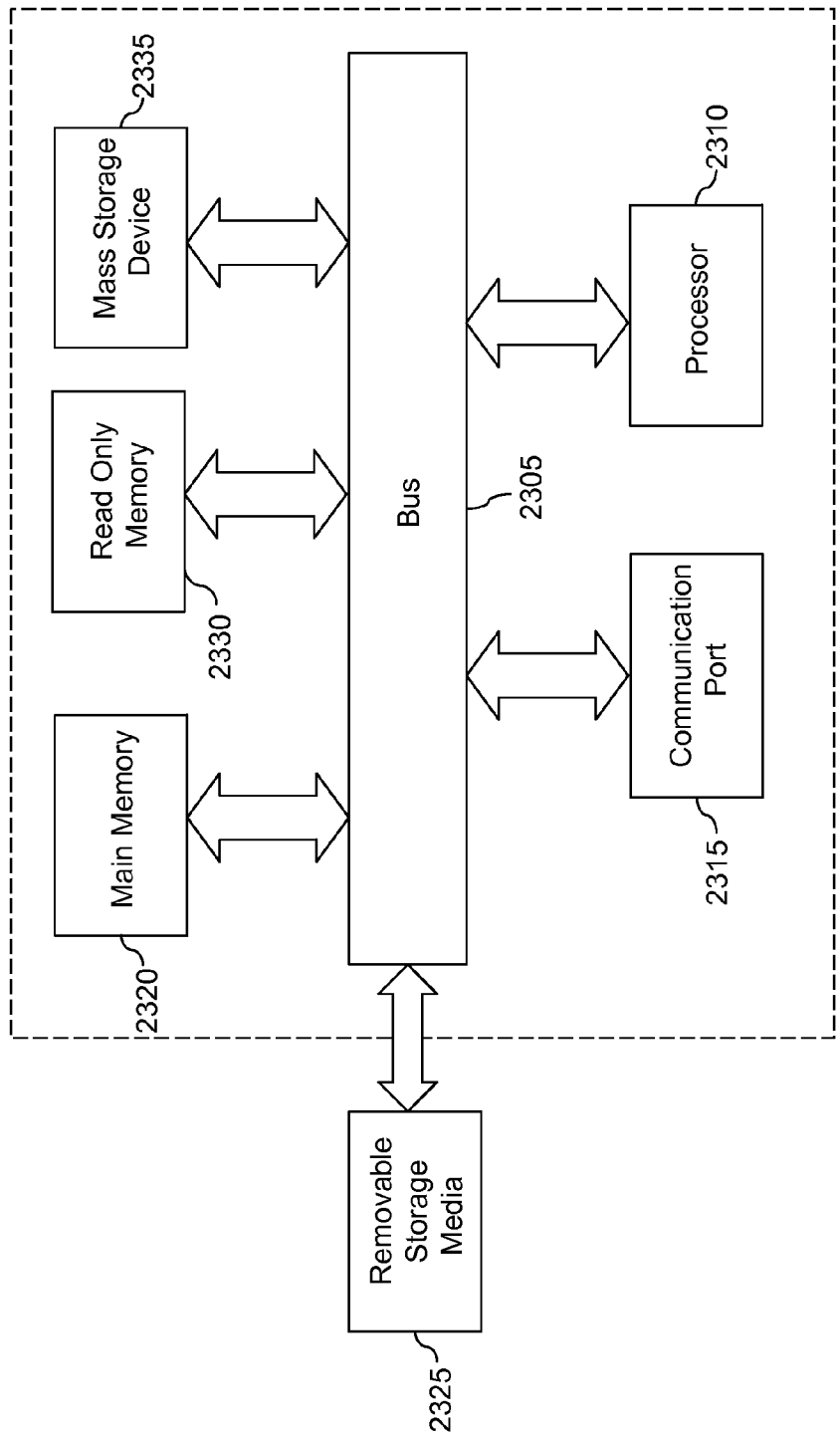

for multiple optical encoding techniques when imaging a point source object;

FIG. 18 provides an example application using the spinning point spread function for extended depth of field according to one or more embodiments of the present invention;

FIG. 19 provides an exemplary embodiment of a spinning PSF coding mask which may be placed in the pupil plane, for example, in accordance with some embodiments of the present invention;

FIG. 20 provides an exemplary embodiment of spinning PSF coding masks designed to utilize phase modulation to vary the operational depth of field of the system;

FIGS. 21A-21B illustrate MTFs as a function of defocus for the previous art in extended depth of field and of MTFs as a function of defocus for the spiral PSF;

FIG. 22 provides a visual definition of spiral point spread function according to one or more embodiments of the present invention; and FIG. 23 illustrates an exemplary computer system that may be used in one or more embodiments of the present invention.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to systems and methods with optimal 3D localization procedures in photo-activation localization microscopy. More specifically, some embodiments relate systems and methods for precise object or particle position estimation in 3D with an increased resolution for a given number of photons detected and reduced data acquisition time for a given target resolution. For example, in some embodiments, the stochastic emission of light from molecule ensembles may be imaged as a collection of Point Spread Function (PSF), which may be used for individual estimation of the position of each particle in 3D. A wide-field image may be rendered as the composite of all the estimations from time-multiplexed emission measurements. As an additional example, in some embodiments, the light reflected/emitted/ transmitted from an object may be imaged as the convolution of the Point Spread Function (PSF) and the object, which may be used for estimation of the range to the object in 3D.

Photo-activation localization microscopy is a far-field super-resolution imaging technique based on the localization of single-molecules with sub-diffraction limit precision. Known under acronyms such as PALM (Photo-Activated Localization Microscopy) or STORM (Stochastic Optical Reconstruction Microscopy), these techniques achieve super-resolution by allowing only a sparse random set of molecules to emit light at any given time and subsequently localizing each single molecule with great precision. Recently, such techniques have been extended to three dimensions, opening up unprecedented possibilities to explore the structure and function of cells. Interestingly, proper tailoring of the three-dimensional (3D) point spread function (PSF) can improve 3D position estimation and ultimately resolution.

Traditional methods of 3D single-molecule localization include four main techniques that have been demonstrated in 3D single molecule localization microscopy: bi-plane detection, astigmatic imaging, double-helix (DH) PSF, and interferometric PALM. The first three require minor modifications of a standard microscope and operate over relatively long depth ranges (up to 2-3 pm for DH-PSF). In contrast, interferometric PALM offers superb axial resolution but requires more complicated interferometric arrangements and can only localize molecules over about a 200 nm range.

The fundamental limit to localization performance of each system is evaluated by means of the Cramer-Rao Bound (CRB). The CRB also serves as a benchmark for estimator implementations, by which the realized precision of the estimator should approach this fundamental limit. This is increasingly relevant in single-molecule imaging, where the number of photons is fundamentally limited. Estimators based upon simple geometrical interpretations of the PSF (i.e. centroid, rotation angle, 2D Gaussian-fit) have been implemented and are computationally fast but not efficient because they do not reach the fundamental limit of precision (CRB) for a given physical system. These methods use a coarse approximation of the PSF spatial profile and ignore the signal contributions outside the simplified geometrical fit. More refined algorithms use fits to experimental PSF data but fail to account for varying noise statistics lending them intrinsically sub-optimal as well. Hence, all of the 3D single-molecule position estimation techniques demonstrated in traditional systems have failed to rigorously account for the particular statistical nature of the data acquisition. Moreover, no single-molecule method has been demonstrated that solves the problems of efficient 3D estimation, accounts for the effects of aberrations induced by both the sample and object, or includes a model for engineered PSFs.

Moreover, the sensitivity of an estimator or measurement may be dependent upon the Fisher Information (FI). FI may be used to quantify the PSF dependence on parameters like 3D location and noise sources. FI may be inversely proportional to the lower limit on unbiased estimation precision, the CRB. Together, these measures may provide a metric to evaluate performance of optical and estimator design. PSF alternatives to the clear aperture response have been introduced as optical solutions to lower the CRB of an image-based 3D position measurement. In single molecule microscopy, multi-focal plane (MUM), astigmatic or double-helix PSF (DH-PSF) may be representative of these solutions.

The application of these optical solutions may be coupled with estimation algorithms that are efficient, meaning the realized precision approaches the CRB. This may be increasingly relevant in single molecule imaging, where the number of photons may be fundamentally limited and precision may be imperative. Estimators based upon simple geometrical interpretations of the PSF (e.g., Full-Width Half-Max, rotation angle, etc.) have been implemented and may be useful because they may be calibrated for system aberrations and are typically fast. However, these estimators may not necessarily be efficient. They may approximate the spatial profile of the PSF or lack a probabilistic treatment in the presence of noise. In contrast to this, various techniques have been implemented on more conventional optical geometries to address the issue of noise but these may fail to include the effects of aberrations induced from the sample or the microscope.

Various embodiments of the present invention provide an optimal estimator for 3D localization using engineered PSFs. For example, some embodiments include explicit statistics into an estimation algorithm. This enables a definition of a most-likely 3D position, i.e. a maximum-likelihood estimator (MLE). In accordance with various embodiments the MLE is an information efficient procedure that achieves the CRB for 3D localization in the presence of aberrations and using engineered PSFs.

To estimate the position of each molecule, embodiments of the present invention can use a Phase Retrieval (PR) enabled MLE. Various embodiments of this estimator can reach the fundamental limit of 3D precision in single-molecule localization while accounting for inevitable optical aberrations. Experimental demonstration of a double-helix PSF microscope using a PR-enabled MLE realizes unmatched low-photon-count 3D wide-field single-molecule localization performance. Some embodiments may use super-resolution microscopy techniques, such as PALM/STORM to enable the recording of multiple single-molecules in parallel with each molecule experiencing only one photo-activation cycle. In addition, one or more embodiments can use these techniques for simultaneously tracking individual molecules over time or measuring the distance between pairs of molecules.

Optical aberrations that distort the ideal image of a single molecule, which affects localization precision, can be a problem with traditional systems and methods. Recent demonstrations of single-molecule 2D localization methods assume a model that is often inconsistent with the physical optical aberrations introduced either by the optics or the sample itself leading to systematic errors. Furthermore, unconventional 3D PSF designs have been introduced to improve 3D localization but experimental demonstrations have so far implemented sub-optimal 3D estimation. In contrast, various embodiments of the present invention can improve and/or eliminate each of these three problems for the first time by providing optimal 3D localization for arbitrary 3D PSFs while rigorously accounting for the inevitable optical system aberrations over an extended axial range.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other devices or machines) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to photo-activation localization microscopy, embodiments of the present invention are equally applicable to various other arrangements for precise particle position and object estimation in 3D. For the sake of illustration, various embodiments of the present invention have herein been described in the context of physical components, devices, computer programs, and logical interactions thereof. Importantly, while these embodiments describe various aspects of the invention, the method and apparatus described herein are equally applicable to other systems, devices, networks, configurations, etc. as one skilled in the art will appreciate. As such, the illustrated applications of the embodiments of the present invention are not meant to be limiting, but instead exemplary.

TERMINOLOGY

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

Some embodiments of the present invention use a model based on experimental calibration. Unfortunately, a detailed and exhaustive calibration of the PSF at single nanometer shifts, if possible, is not always practical because of the required large data acquisition sets, which either become less precise or demand longer calibration times. Hence, some embodiments use a phase retrieval method to accurately recover the 3D PSF at arbitrary coordinates over a continuous 3D domain based on only a few calibration measurements.

In order to generate a proper model of the imaging system that accounts for the presence of aberrations, a set calibration images, $\{PSF_{z1}, PSF_{z2}, \ldots, PSF_{zN}\}$, and PR algorithm are used to solve for the complex field of the PSF, $$f_{zn}(x,y) = |\sqrt{PSF_{zn}(x,y)}| e^{i\phi_{zn}(x,y)} \qquad \text{Eq. 1}$$

with zn=z1 ... zN indicating N axial positions.

In accordance with various embodiments, for any location of the molecule in space, an accurate model of the PSF is obtained from the images $|f_{zn}|^2$ by continuously propagating along z and shifting in x, y following the wave equations that govern the evolution of the PSF.

Embodiments of the PR algorithm can be implemented using two or more calibration images of the PSF, taken at well-known coordinates, $\vec{\sigma}_n = \{x,y,z\}$ where n=1, 2. The calibration images can be used as constraints after wave propagation to solve for $f_{zn}$. The propagation can then be described by a defocus operation to calculate $f_{z(n+1)}$, after a shift in object position of $\vec{\sigma}_{SM} = \{\Delta x, \Delta y, \Delta z\}$. While not required, increasing the number of calibration images can improve convergence and robustness of the phase retrieval in the presence of noise in some cases.

Knowledge of the absolute value of the amplitude for $f_{zn}$ and $f_{z(n+1)}$ can be provided from the calibration images as $\sqrt{PSF_{zn}}$ and $\sqrt{PSF_{z(n+1)}}$, respectively. After numerical propagation, the phase component of $f_{z(n+1)}$ can be kept as it represents an improvement in the estimation of this function. $f_{z(n+1)}$ can them be reverse-propagated to provide a new estimate for $f_{zn}$. Iteration between the multiple images can continue in some embodiments until a measure of convergence shows asymptotic behavior. In some implementations of embodiments of the present invention, sub-sampling the PSF onto the CCD and the non-zero width of the fluorescent emission spectrum may not be observed to affect the PR method. However, other embodiments of the PR can be further refined using known methods. In some embodiments, a generalization of the methods presented here are also possible for non-isoplanatic systems. The result of the phase retrieval is a rigorous interpolation of the calibration data that can be used in the MLE process.

Exemplary Implementation of PR Algorithm And MLE

Figure 1A:
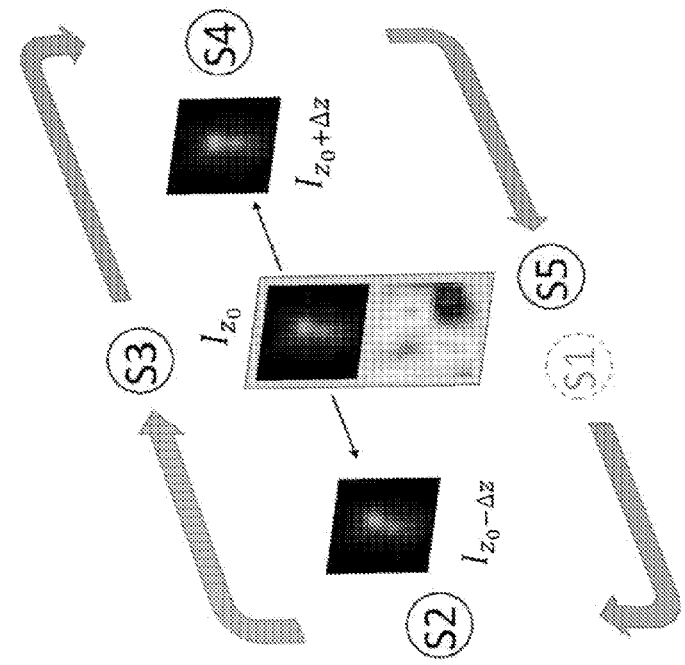
FIG. 1A illustrates an exemplary phase retrieval algorithm that may be used in accordance with various embodiments of the present invention.
Figure 1B:
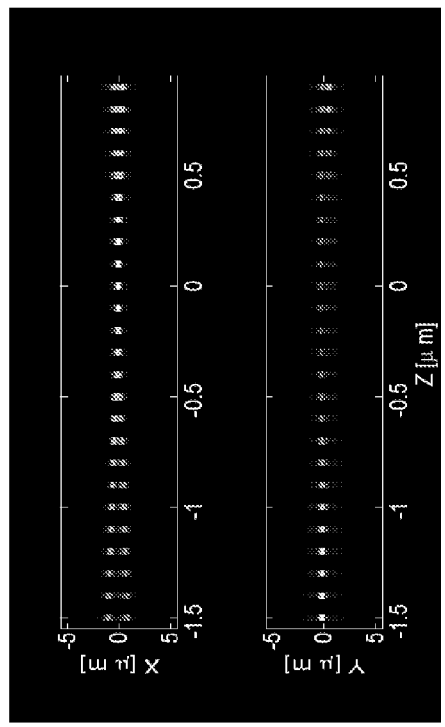
FIGS. 1B-1C illustrate a comparison of the axial dependence for some experimental and interpolated images of an aberrated double-helix PSF in accordance with one or more embodiments of the present invention.
Figure 1C:
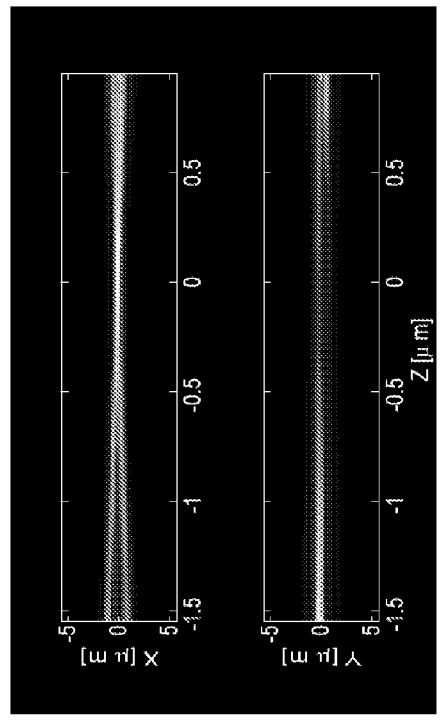

FIG. 1A illustrates an exemplary phase retrieval (PR) algorithm for engineered/aberrated PSF recovery that may be used in accordance with embodiments of the present invention. In FIG. 1A, a sequence of calibration images are used for recovering the image-space field or pupil function of the optical system associated with the aberrated and/or engineered point spread function. In the embodiments shown, the search procedure uses five steps (S1-S5) per iteration until a solution converges at plane z0. Comparison of the axial dependence for the experimental and interpolated images of the aberrated double-helix PSF are given in FIGS. 1B and 1C, respectively. In FIG. 1B, projections of the experimental images along the X and Y axes with axial propagation show the discrete character of the calibration data. In FIG. 1C, the results from the phase-retrieval algorithm behave smoothly-indicative of proper interpolation of the expected PSF at intermediate image planes.

Various embodiments of the PR algorithm result from increasing the number of constraints on the field and use of calibration images with high SNR. Some implementations of the PR algorithm can impose constraints on the field amplitude at three neighboring axial locations as the square root of the calibration images, $|a_m| = \sqrt{I_m}$. These constraints can be repeatedly enforced while keeping the respective phase information as the field propagates from the plane of interest to neighboring places located a distance $\vec{\sigma} = \{\Delta x = 0, \Delta y = 0, \Delta z = \pm 100 \text{ nm}\}$ away according to, $$a_k(x', y', \vec{o}) \propto$$

$$\mathcal{F}\left\{\mathcal{F}^{-1}\{a_j(x', y', \vec{O})\}\left(\frac{u}{\lambda f}, \frac{v}{\lambda f}\right) e^{\frac{2\pi i}{\lambda f} M(u\Delta x = v\Delta y)} e^{-\frac{\pi i}{\lambda}\left(\frac{u^2+v^2}{f^2}\right) M^2 \frac{\Delta z}{n}}\right\}$$

Where $a_k(x',y';\vec{o})$ represents the field propagated from $a_j(x',y';\vec{O})$, $\vec{O}$ is the null vector and j,k=1, 2, ... N where N is the number of calibration images.

The exemplary PR algorithm shown in FIG. 1A starts with Step S1. Step S1 begins with an initial phase estimate for $a_j(x',y';\vec{O})$ at the plane $z_0$. At step S2, the adjacent filed at $z_0 - \Delta z$ is estimated by propagation according to Eq. 1 a distance $-\Delta z$ and enforcing the amplitude constraints from the calibration image while keeping the phase information. Steps S3 and S4 successively enforce the amplitude constraints upon propagating to the places at locations $z_0$ and $z_0 + \Delta z$. The final step, S5, propagates from $z_0 + \Delta z$ to $z_0$, representing one complete iteration of the PR algorithm.

The phase retrieval results were used in the 3D search after an initial estimate was made on the 3D location of the object of interest. This can reduce the complexity of the algorithm and be used to search the global space for the best match before the MLE is implemented. The initial guess may obtained in various embodiments using the spatial frequency amplitudes of the experimental image and finding the closest match with the calibration images in a sum squared error (SSE) sense, $$\min_{\Delta a \in \left[-\frac{(N-1)}{2}\Delta z, \ldots, \frac{(N-1)}{2}\Delta z\right]} \left\{ \sum_{m=1}^{M} \right.$$

$$\left. \sum_{n=1}^{N} (|\mathcal{F}\{|a^2|\}|(m, n; \Delta z) - |\mathcal{F}\{I_{exp}\}|(m, n))^2 \right\}$$

where N axial calibration images separated by an axial distance $\Delta z$ were used. This initial process reduces the coarse search from three dimensions to the axel dimension, hence ignoring the linear phase in the spatial frequency domain responsible for transverse shifts. After an initial estimate was found for the axial plane, it is transversely cross-correlated with the experimental image to find coarse $\Delta x$, $\Delta y$ coordinates. With these initial coordinates, an iterative algorithm can be implemented to find the optimum 3D coordinate in the object space $\vec{O} = \{\Delta x, \Delta y, \Delta z\}$ that maximizes the probability of matching the experimental pattern to a specific PSF cross-section in the presence of noise (maximum likelihood), $$\max_{\vec{o} \in R} \{\mathcal{L}(I_{exp}(m,n); a(m,n;\vec{o}))\}$$

The likelihood function ($\mathcal{L}$) can be selected to suit the appropriate imaging conditions under examination. Examples of common likelihoods include the Poisson and Gaussian distributions, $$\mathcal{L}\left(I_{exp}(m,n); a(m,n;\vec{o})\right) = \prod_{h=1} M \prod_{n=1} N \frac{(|a(m,n;\vec{o})|^2)^{I_{exp}(m,n)}}{I_{exp}(m,n)!} e^{-|a(m,n;\vec{o})|^2}$$

and $$\mathcal{L}\left(I_{exp}(m,n); a(m,n;\vec{o})\right) =$$

$$\Pi_{m=1} M \Pi_{n=1} N \frac{1}{\sigma\sqrt{2\pi}} e^{-\frac{(\sqrt{I_{exp(m,n)}} - |a(m,n;\vec{o})|^2)^2}{2\sigma^2}},$$

respectively. Note that the image space coordinates (x',y') of Eq. 1 have been replaced with the discretely sampled coordinates, (m,n). The maximization of the argument in Eq. 3 is realized with the following gradient-descent iterative search algorithm, $$o_j^{(p+1)} = o_j^p - \gamma \left(\frac{\partial^2}{\partial j^2} L(I_{exp}; a(\vec{o}))\right)^{-1} \frac{\partial}{\partial j} L(I_{exp}; a(\vec{o}))|_{j=op(p)}$$

where j∈{x,y,z}, p is the iteration number and γ is an update equation scale factor (e.g., ranging 1>=γ>=1e-4). The derivatives are found numerically using central difference methods for the first-order derivative, $$\frac{\partial}{\partial j} L(I_{exp}; a(\vec{o})) = \frac{L(I_{exp}; a(\vec{o}+\vec{h})) - L(I_{exp}; a(\vec{o}-\vec{h}))}{2|\vec{h}|}$$

and the second-order derivative, $$\frac{\partial^2}{\partial j^2} L(I_{exp}; a(\vec{o})) = \frac{L(I_{exp}; a(\vec{o}+\vec{h})) - 2L(I_{exp}; a(\vec{o})) + L(I_{exp}; a(\vec{o}-\vec{h}))}{|\vec{h}|^2}$$

where $\vec{h}$ is the displacement vector $\{h_x,h_y,h_z\}$ with non-zero values only along the direction that the derivative is taken.

Maximum Likelihood 3D Localization Estimation

The optical system description given by the experimental PSF and, if needed obtained via the PR process, is utilized in the second stage of the search procedure, where for a given experimental image $I_{exp}$, the optimal estimator searches the object space $\vec{o}$ for the most likely PSF match $f(x,y)$, i.e. the position $\vec{o}_{SM}=(x,y,z)$ of the single-molecule that maximizes the likelihood function.

$$\hat{o}_{SM} = \arg\max_{\vec{o} \in R^3} L(I_{exp}; f(\vec{o}))\} \qquad \text{Eq. 2}$$

Here, $\mathcal{L}$ represents the likelihood of the match at $\vec{o}$ in the presence of noise processes such as Gaussian or Poisson.

A proper initial guess can accelerate the convergence properties of the MLE. For example, the number of iterations may change as well as solutions that settle on local and global extrema. Accordingly, the starting axial location $\Delta z^{(1)}$ may be found using the calibration image that best matches the experimental image using a metric based on the sum-squared-error of the Fourier coefficients amplitude. This results in an initial Z estimate that is unrelated to the transverse position. The transverse coordinates of the initial estimate $\Delta x.\Delta^{(1)}$, are found using a cross-correlation of the experimental image with the previous (best match) calibration image. The maximization in Eq. 2 can then achieved using the iterative update solution, $$O_j^{(p+1)} = O_j^{(p)} - \gamma \left(\frac{\partial^2}{\partial j^2} L(I_{exp}; f)\right)^{-1} \frac{\partial}{\partial j} L(I_{exp}; f)\Big|_{j=o_j(p)}$$

to find the most-likely match, where j∈{x,y,z} and p is the iteration number.

Performance on Simulations

In some embodiments, the estimation efficiency of the MLE may be quantified by simulating a DH-PSF microscope with NA=1.3, M=91×, merely by way of example. A single-molecule with average isotropic emission at λ=515 nm, for example, may be imaged using the DH-PSF microscope. The optical configuration is designed to match that of the typical experimental implementation given FIG. 2.

Figure 2:
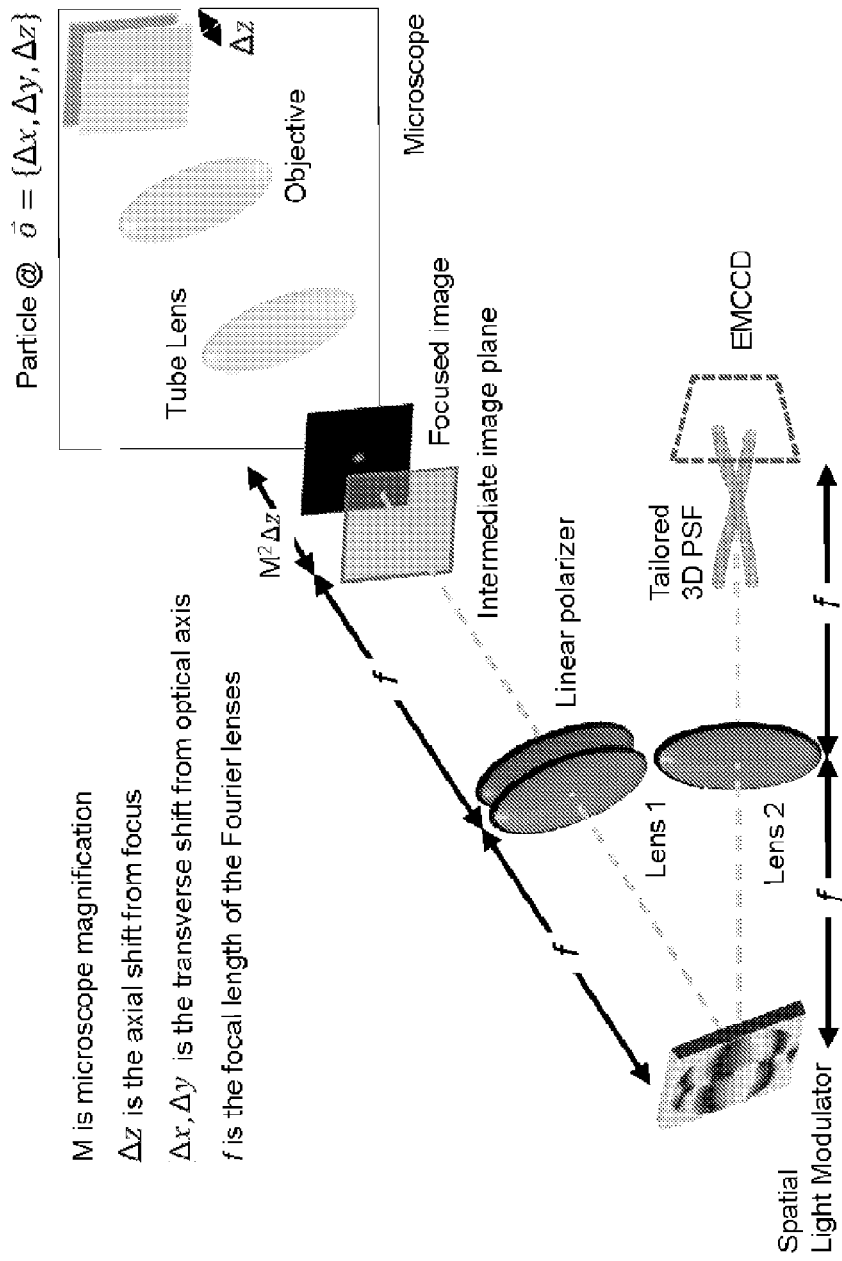
FIG. 2 illustrates an optical layout of a PSF engineered microscope according to some embodiments of the present invention.

The experimental setup shown in FIG. 2 was used to image PA-GFO labeled proteins within a sample of Kangaroo Rat Epithelial cell. The sample was continuously illuminated at $\lambda_b$=488 nm with an Argon laser source to bleach the fluorophores. The reactivation illumination uses a laser diode source emitting at $\lambda_r$=405 nm and a function generator to produce 500 ms pulse at 0.2 Hz.

In this experiment, the sample was bleached with illumination at 488 nm generated via an Argon laser. A small subset of the photo-activatable fluorophores was re-activated via illumination at 407 nm. The 488 nm light simulates emission of this subset and the double-helix microscope collects the associated light. A traditional microscope with a 1.3NA objective was appended with a 4F optical setup where a spatial light modulator (SLM) was placed in the Fourier plane. The double-helix phase mask was generated on the SLM to encode the light emission with the appropriate characteristic for subsequent imaging on an electron-multiplying CCD (EM-CCD) after the second Fourier lens (Lens2).

A microscope objective of magnification M=91× and 1.3NA is used to image the samples, where the object space coordinate $\vec{o}=\{\Delta x,\Delta y,\Delta z\}$ provides the distance of the particle from the object space optical axis and focal plane. The image conjugate to the focal plane is named the intermediate image place. This intermediate image serves as the focal place of the 4F optical system located after the microscope stage.

A reflective Spatial Light Modulator (e.g., SLM, Boulder Nonlinear Systems XY-P512 SLM) can be placed in the Fourier plane of the 4F system to encode the incident wave field with a double-helix PSF transfer function. A pair of achromatic lenses (focal length f=250 mm) and a linear polarizer make up the rest of the 4F system in the embodiments shown. The linear polarizer can be utilized to select polarization parallel to the active axis of the liquid crystal modulated by the SLM. The loss of photons in the orthogonal polarization state is not necessary and can be solved by replacing the linear polarizer with a polarizing beam splitter (PBS) followed by a second channel containing either a second SLM or a half wave plate and redirectional optics so that all photons collected by the microscope optics are transformed to linearly polarized parallel to the active axis of the SLM. Alternatively, a polarization insensitive phase mask can be implemented. The final image can then be formed on the electron-multiplying CCD (Andor iXon EM-CCD) located a distance f behind the final 4F lens.

To maximize the light efficiency of the DH-PALM system, the light from the first Fourier lens may be obliquely incident on the SLM so that reflected light may pass through the second Fourier lens without the use of beam splitters. This oblique incidence introduces two sources of aberration into the optical system: one from the relative loss in modulation contrast of refractive index seen by the incident light as it is modified by the SLM and the second being the loss of modulation from the projection of a circularly apertured incident field onto the now elliptically apertured phase mask. Additional sources of aberration include the use of a tilted camera in this system and those inherent to volume imaging such as objectives that are optimized for imaging a single plane with minimal aberration at the cost of volume performance. Lastly, imaging sources at varying depths beyond the cover slip will be subject to spherical and specimen-induced aberrations.

The DH-PSF may manifest as a pair of intense lobes that rotate as the object moves axially. The number of photons detected from the molecule is varied across a representative range. Poisson noise may be considered the dominant noise process, consistent with some ideal experimental conditions. To establish the performance under shot noise, no background noise is included initially. Calibration images for the PR algorithm are generated at 100 nm intervals with 100 noisy images taken at each position.

FIGS. 3A-3D show the efficiency of an optimal 3D Position Estimator-reaching the fundamental information limits. The performance of three position estimation algorithms is compared relative to the Cramer-RaoBound (CRB) on simulated data in the shot noise limit. The simple rotation angle estimator (AE) shows sub-optimal performance. Two maximum-likelihood estimation (MLE) implementations are presented: (i) MLE with the pupil phase known a priori, demonstrates the performance of the MLE when exact system model issued, (ii) MLEPR, demonstrates the performance of the estimator when the pupil phase is estimated with a phase-retrieval algorithm. A-C, the standard deviation of the estimators along the X, Y and Z dimensions as a function of the number of detected photons. D shows the volume of the uncertainty ellipsoid, indicating the volume that a particle may be localized to.

In FIGS. 3A-3D, the MLE performance is presented along with a typical estimator that uses the rotation angle of the DH-PSF for axial estimation and the centroid for transverse localization (angle estimator, AE) Calibration images were taken using samples prepared with 40 nm diameter fluorescent microspheres (e.g., Invitrogen yellow-green carboxylate-modified FluoSpheree). The microspheres were chosen to have similar fluorescent spectrum to the PAGFP in order to minimize performance differences due to chromatic effects. The 40 nm bead size is well below the diffraction limit of the microscope, therefore they were treated as point sources.

The calibration data can be generated by images collected as the sample stage is translated in 100 nm intervals through the focal plane. Twenty-six images (on average) were used at each axial location to form each calibration image for phase retrieval. Using the results from the phase-retrieval algorithm, tracking of these beads was implemented with the pattern matching MLE search to test performance.

The plots in FIGS. 4A-4B show the estimation results without correction for drift to demonstrate the precision of the MLE as well as the true variability of the calibration sources. After correction for linear drift, the best performance was measured at z=−600 nm, with a standard deviation of the localization $\sigma_{MLE}(\Delta x, \Delta y, \Delta z) = (4.1, 2.8, 2.9)$ nm and $SNR_{avg}=513$, defined as $\sqrt{N_\gamma}$ where $N_\gamma=263254\pm4981$. The angle/centroid estimation (AE) algorithm used in FIGS. 3A, 3B, 3C, 3D, 4A, and/or 4B searches for the two peaks and calculates the respective centroids. The centroids were calculated on the intensity-cubed of the experimental images to produce robust results. The center-of-mass of the two centroids provides an estimate for XY coordinates and the relative rotation angle is correlated to the axial distance using a spline-interpolant fit.

In particular, FIGS. 4A-4B illustrate the calibration data from fluorescent bead sources. FIG. 4A illustrates the fluorescent nano-particle calibration images are tracked as a piezo-electric stage is translated in 100 nm intervals through the volume of interest. FIG. 4B shows the PR-MLE estimates near z=−600 nm (31 estimates) are shown as histogram sin X, Y and Z with localization precisions reported of $\sigma(X,Y,Z)=(4.1,2.8,2.9)$ nm—a localization volume of 141 $nm^3$.

A second molecule experimental localization is presented here. FIGS. 5A-5C show experimental estimation performance of a single molecular localization where the PR-MLE localized this molecule to $\sigma_{MLE}(\Delta x, \Delta y, \Delta z) = (11.5, 8.0, 11.0)$ nm. A single molecule is identified with an average of 1520+/−168 photons being collected per image over a series of 25 images. FIG. 5A shows representative images of the experimental data when the minimum, average and maximum number of collected photons are present. FIG. 5B shows histograms of the X, Y and Z localization of the emitter, demonstrating localization precision of 11.5 nm, 8.0 nm, 11.0 nm, respectively. FIG. 5C shows a volume visualization of the uncertainty ellipsoid associated with the resulting estimations and the scatter of the individual measurements.

Figure 6B:
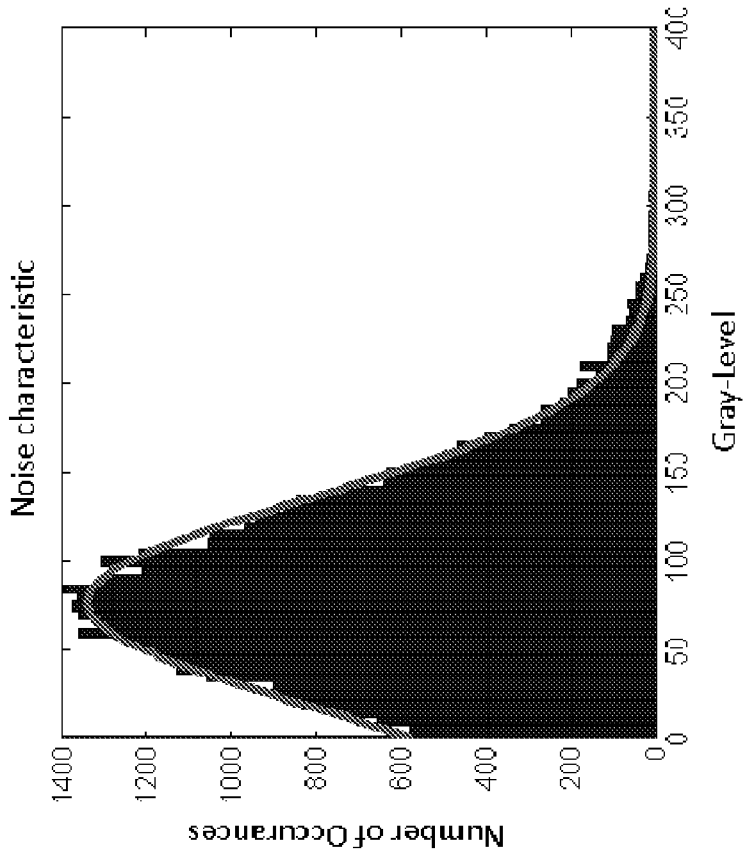
FIGS. 6A-6B show experimental noise characteristics that can result from the use of various embodiments of the present invention.
Figure 6A:
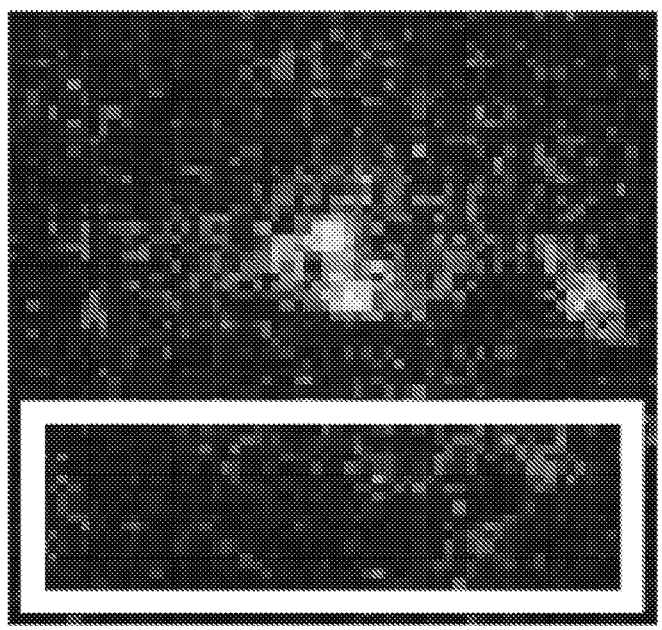

Note that the increase in localization precision is consistent with an increase in the average detected number of photons but now providing a lower localization metric $C^{3D}=380$. A Gaussian pdf was used for the PR-MLE algorithm and is justified by examination of the image noise statistics shown in FIGS. 6A and 6B. FIG. 6A shows an experimental image of a single molecule which has been post-processed to subtract the non-uniform background. FIG. 6B shows that when taken as a data series of 31 images, the distribution of gray-levels within the region highlighted in white is observed to be of constant mean with statistics approximately described by Gaussian processes.

The data ensemble used for testing MLE performance was a collection of 100 simulated noisy images with a varying mean number of total photons as indicated by the abscissa of the plot. About 20 iterations were required for the MLE to converge on each estimate. The CRB is given to provide a measure of efficiency quantified by $$\varepsilon = \frac{\sigma est}{\sigma CRB}$$

—the ratio of the chosen estimator precision to that of the CRB. For a system PSF known a priori, $\epsilon_{MLE,ap}(x,y,z)$= (1.0±0.1, 1.0±0.1, 1.1±0.1); while when the PR algorithm is invoked, $\epsilon_{MLE,PR}$ (x,y,z)=(1.0±0.1, 1.0±0.1, 1.1±0.1). The faster angle-based estimator (AE) is less efficient with $\epsilon_{AE}$(x,y,z)=(1.9±0.1, 5.2±0.4, 1.8±0.2). As a result, using MLE reduces the uncertainty ellipsoid volume $$\left(V = \frac{4}{3}\pi\varepsilon_x\varepsilon_y\varepsilon_z\right)$$

by 16× when the PSF is known and by 11× when PR is used.

Figure 7C:
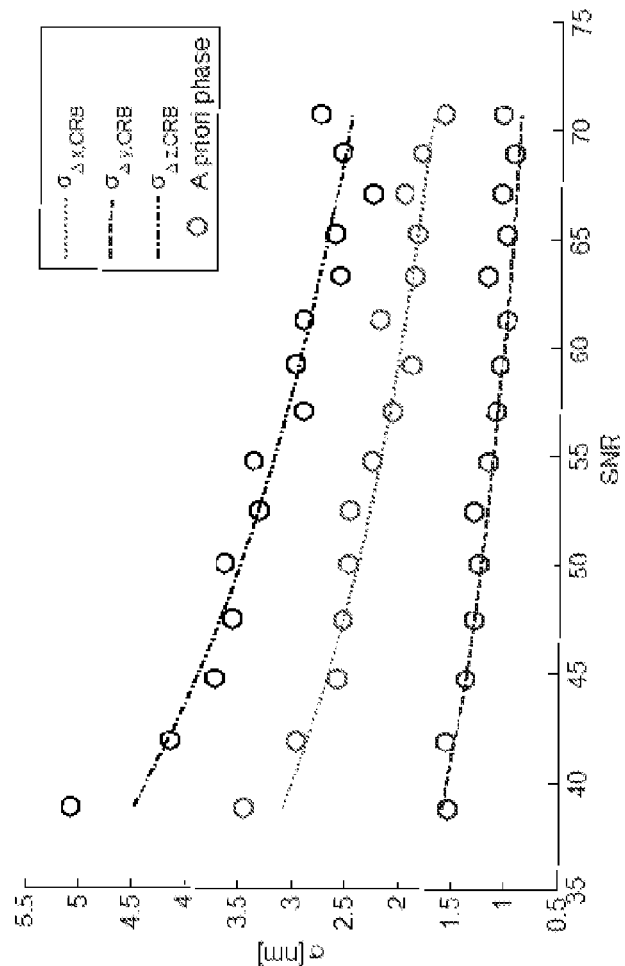
FIGS. 7A-7C show MLE estimation of aberrated PSFs with Gaussian noise resulting from an application of some embodiments of the present invention.
Figure 7A:
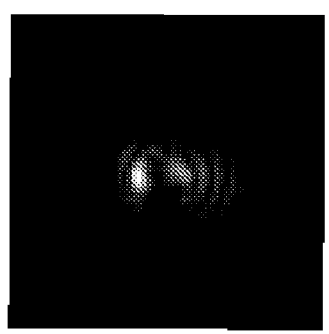
Figure 7B:
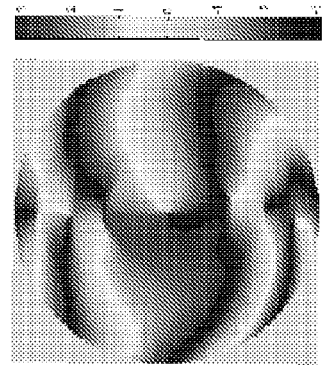

The results shown in FIGS. 3A-3D imply that the MLE estimator provided by various embodiments of the present invention can be efficient in reaching the performance limit in the shot noise limited case. FIGS. 7A, 7B, and/or 7C shows that the estimator of several embodiments of the present invention can also be efficient in the presence of severe aberrations and in the Gaussian noise limit. The experimental conditions including measured aberration and noise level are simulated. Results demonstrate the efficiency of the estimator for 3D localization of molecules in reaching the information theoretic limit. In FIG. 7A, the aberrated PSF in the simulation has an asymmetric distribution of photons between the two peaks as observed in the experimental data. FIG. 7B shows the associated double-helix pupil function with coma and spherical aberrations present. FIG. 7C shows the results from the MLE estimation relative to the information theoretic (CRB) limit when Gaussian noise is the dominant random process.

The Cramer-Rao bound (CRB) is a measure of the optical system's capability to precisely estimate a set of parameters, here the 3D position of an object. The CRB provides the theoretical lower limit of the variance for any unbiased estimator in the presence of noise. It is found from the universe of the Fisher information, CRB≥FI($\vec{o}$)$^{-1}$ where, $$FI_{j,k} = \sum_{m=1} M \sum_{n=1} N \left\{ \frac{\partial}{\partial j} \ln pdf(|a(m,n;\vec{o})|^2) \frac{\partial}{\partial o_k} \ln pdf (|a(m,n;\vec{o})|^2) \right\}$$

and $\{j,k\} \in \{\Delta x, \Delta y, \Delta z\}$.

Figure 3A:
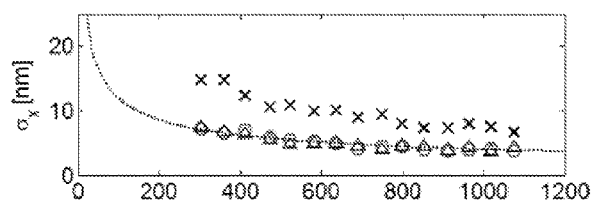
FIGS. 3A-3D show the efficiency of a 3D position estimator reaching the fundamental information limits in accordance with embodiments of the present invention.
Figure 3B:
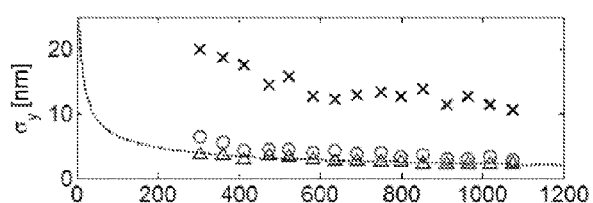
Figure 3C:
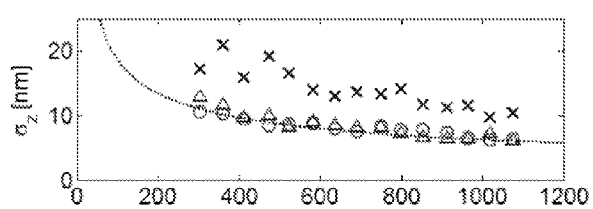
Figure 3D:
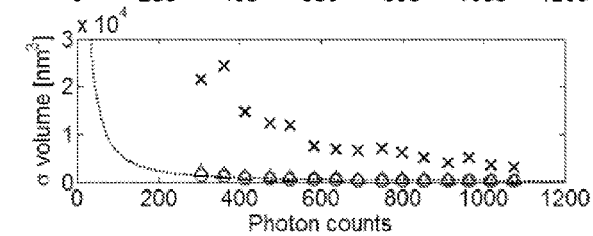

The CRB for a system similar to the one implemented experimentally is plotted in FIGS. 3A, 3B, 3C, and/or 3D. To independently quantify the performance of the phase retrieval algorithm and MLE, the algorithm was tested under two scenarios. In the first scenario, the MLE was implemented with the priori knowledge of the pupil function (circles in FIGS. 3A, 3B, 3C, and/or 3D). In the second scenario, the output from the PR algorithm was used for the pupil function (triangles in FIGS. 3A, 3B, 3C, and/or 3D). A series of 100 noisy images were simulated in the presence of Poisson noise and zero background for a variety of photon counts. The range of emitted photons corresponds to those observed in our single molecule experiment using PA-GFP as well as previously reported endogenous fluorescing proteins. The simulated calibration images used in the phase retrieval algorithm were also in the presence of Poisson noise and had an SNR of 256 (equal to that of the 16-bit detector). Prior work has shown that the standard deviation of the estimation precision should change as $N_\gamma^{-0.5}$, where $N_\gamma$ is the number of photon counts. Curve fitting to the CRB limited standard deviation yields $b_{CRB}$ ($\Delta x,\Delta y,\Delta z$)=(−0.48, −0.48, −0.48), to the a priori phase information MLE $b_{apMLE}$ ($\Delta z,\Delta y,\Delta z$)=(−0.52, −0.43, −0.55) and to the PR MLE $b_{PRMLE}$($\Delta,\Delta y,\Delta z$)=−0.56, −0.56,0.37), where $f(N)=aN^b$.

The experimental data presented was heavily corrupted by noise. The electron multiplication gain, photon counting statistics, random motion, and high background, generate noise contributions well described by a Gaussian random process as a consequence of the central limit theorem. The experimental image is shown in FIG. 6A with a histogram of the background pixel counts shown in FIG. 6B, which is indicative of dominant Gaussian noise. The MLE is verified to reach the CRB in the case of such Gaussian noise processes with results of the estimator given in FIGS. 7A-7C. Note that this estimation was also taken in the presence of additional aberrations in the imaging pupil as shown in FIG. 7B.

One advantage of the PR algorithm is the ability to recover an accurate representation of the optical pupil function. In accordance with various embodiments, this pupil function can then propagated in three dimensions (X,Y,Z) to find the most likely match.

Figure 8B:
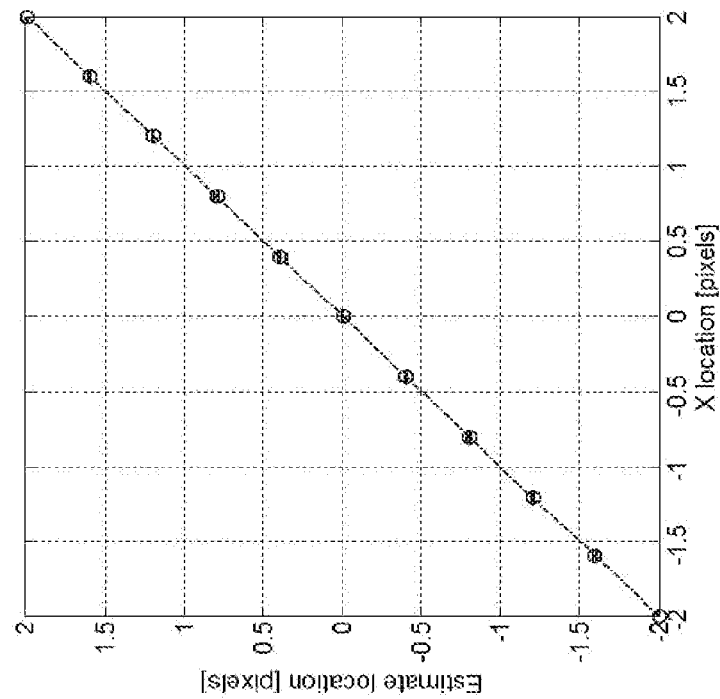
FIGS. 8A-8B show PR-MLE results for estimation of sub-sampled 3D translations in accordance with embodiments of the present invention.
Figure 8A:
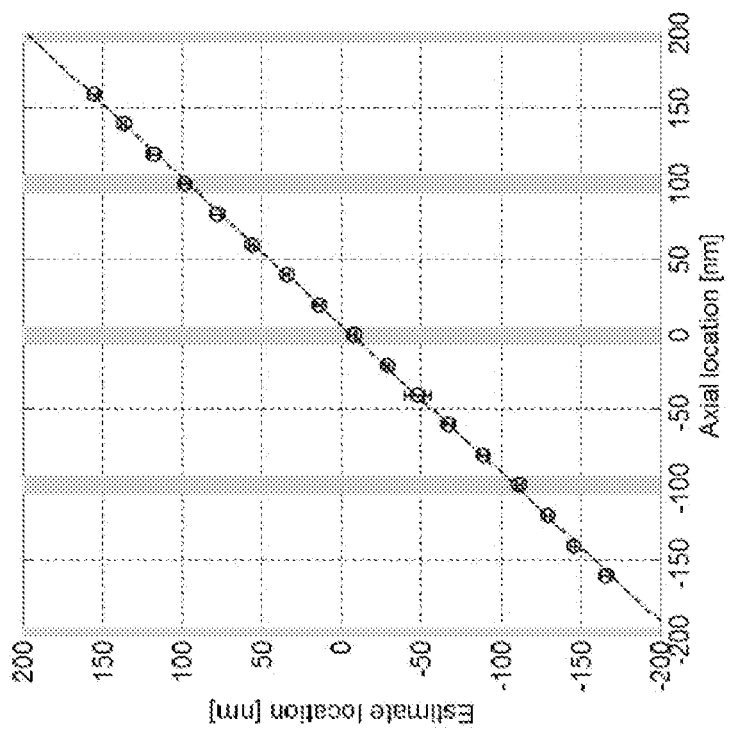

In order to test the quality of the interpolation in the regions not bound by the constraints of a calibration image two tests are proposed. The first test examines the localization accuracy and precision in the axial regions between the calibration planes. FIG. 8A shows that the phase-retrieval results behave approximately in a linear fashion between the calibration planes and that the accuracy and precision are on par with that given in the calibration planes. In FIG. 8B, the transverse localization was tested for sub-pixel shifts in the PSF. Again, the phase-retrieval results behave linearly and accurately with sub-pixel shifts in the transverse dimension—indicating that the PR-MLE behaves as would be expected. To further illustrate the interpolation properties of the PR-MLE, the interpolated images are compared to the experimental images in FIG. 1B. The experimental images in FIG. 1B are shown to be discrete measurements, while the interpolated results from the PR-MLE in FIG. 1C are observed to be smoothly varying.

Experimental Results

A sample of PtK1 (Rat Kangaroo Kidney Epithelial) cells expressing PA-GFP-tubulin was examined experimentally using DH microscope in FIG. 2 in the PALM/STORM modality. The histograms in FIG. 9B or FIG. 9C show estimator results of the PR-MLE on a series of 15 images of one single molecule among the stochastically activated ensembles. The precision of 3D localization measurement for a single was $\sigma_{MLE}$(X,Y,Z)=(15.7, 9.6, 24.5) nm. The average number of photons in the PSF per image was 1285+/−233. A single molecule was localized via a series of 15 images using the AE algorithm and the PR-MLE.

FIG. 9A shows experimental images of the molecule with the minimum, average and maximum number of photons. FIG. 9B shows histograms for the AE estimation results localizing the molecule in 3D. FIG. 9C shows histograms for the PR-MLE estimation results localizing the same molecule. FIGS. 9D-9E show a volume visualization of the localization improvement when using the PR-MLE versus the AE.

Figures 10A, 10B, 10C:
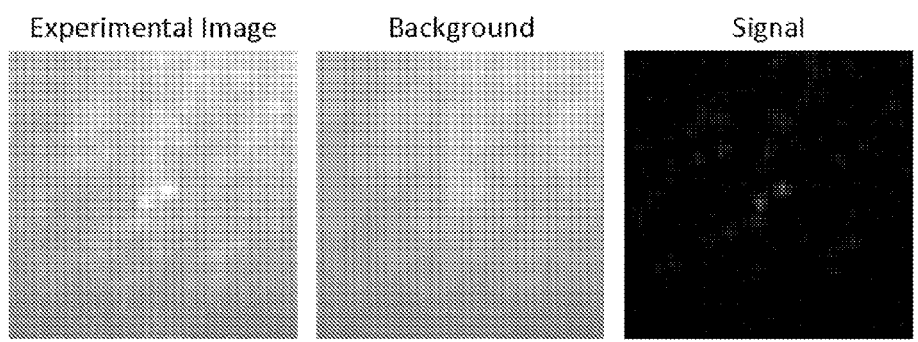
FIGS. 10A-10C illustrate the results from an exemplary background subtraction algorithm for experimental images that can be used in various embodiments of the present invention.

In order to count the number of photons in a given molecule image, the spatially varying background should be accounted for. The opening image-morphology operation was utilized to analyze the image and estimate the background. Various embodiments of the process are shown in FIGS. 10A-10C, where a representative experimental image is given. In one or more embodiments, the image-opening background subtraction algorithm searches the image for features that contain disk-shaped elements. By setting the size of the disk-shaped element to the dimension of a DH-PSF lobe, the DH-PSF features may be selected out. FIG. 10A illustrates an estimation using an image morphology operation. FIG. 10B illustrates the resulting background subtracted image FIG. 10C can then used for the PR-MLE according to various embodiments of the present invention.

Figures 11A, 11B, 11C:
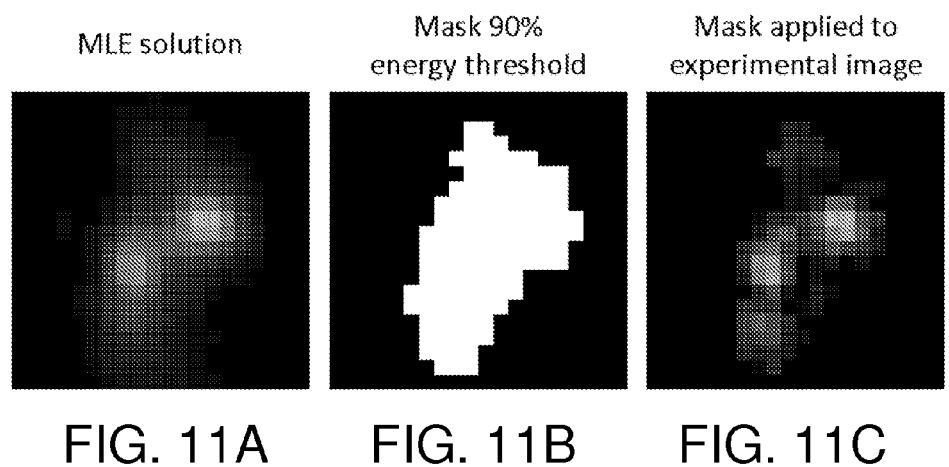
FIGS. 11A-11C show various exemplary images that may be created with counting the number of photons in an arbitrary PSF according to some embodiments of the present invention.

The experimental images were collected using an electron multiplying CCD (And or iXon). The number of photons incident on the detector was calculated as follows, $$N_\gamma = \left[\left(\frac{L}{G_{EM}}\right)\frac{G_{AD}}{\eta}\right]\left(\frac{C}{hc}\right)$$

Where L is the counts output from the A/D converter, $G_{EM}$ is the electron multiplication gain (64.9225 in single molecule experiments), $G_{AD}$ is the number of electrons per A/D count (11.4697), η is the quantum efficiency of the detector (0.95 @ 515 nm), C is the number of eV to generate 1 electron in silicon (3.65), h is Plank's constant and c the speed of light. The photon counts were then translated into the number of photons present in the molecule image as shown in FIGS. 11A-11C.

The number of photons collected from a single molecule is quantified as the number of counts within the spatially distributed image. Given the most likely match from the pattern matching MLE, a mask is generated as shown in FIG. 11B which represents the transverse map containing X % of the energy in the PSF, where X may vary from 10% to 99%). This mask is applied to the background subtracted experimental PSF to yield the number of photons in X % of the PSF as shown in FIG. 11C. This number is scaled by the expected energy remaining outside the masked region, as determined by the best fit PSF from the MLE, to estimate the total number of photons collected from the source that are used in the estimator.

These results are typical and even better localization precisions have been identified within this data set [$\sigma_{MLE}$ (X,Y,Z)=(11.5,8,11) nm for 1520 detected photons, see FIGS. 5A, 5B, and/or 5C].

As recently demonstrated, sources of noise such as vibrations and imperfections of the detector are normally unaccounted. Hence, the 3D precision above does not reach the sub 10 nm range expected in the shot noise limited case. This raises the question of whether the optimum estimator would work when these practical sources of noise are considered. Such multiple sources of noise are better modeled by Gaussian noise. The MLE is adapted to account for these additional noise sources by changing the noise statistics, proving again to be efficient in reaching the performance limit (CRB) for the given experimental conditions (see FIGS. 7A, 7B, and/or 7C).

Figure 12:
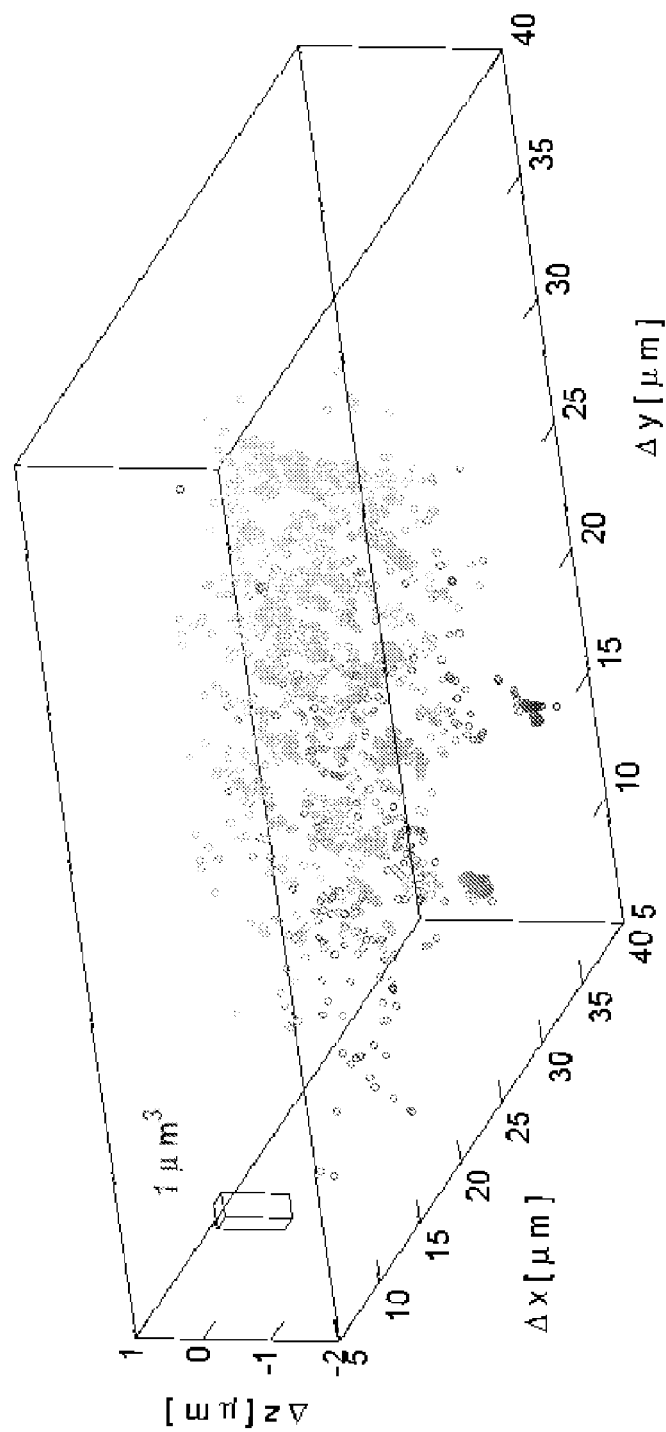
FIG. 12 illustrates a DH-PALM 3D localization image of single PA-GFP molecules in PtK1 cells resulting from use of one or more embodiments of the present invention.

The application of the optimal estimator for DH-PALM imaging of a large array of single PA-GFP molecules in PtK1 cells is demonstrated in FIG. 12. The figure shows high precision 3D localization of single molecules over a large field of view and long depth range.

The pattern matching MLE was performed using images from the wide-field microscope dataset which were accumulated over 3.7 hours. The image acquisition time was set to 500 ms. A confidence measure was assigned to the estimation results according to the similarity of the estimated PSF and the experimental image. If the transverse overlap of the two patterns was greater than 40%, the measurement was kept and used to plot the three dimensional information in FIG. 12.

The results presented here demonstrate that the optimum estimator enables the use of aberrations, either intentional or unavoidable, to precisely localize single-molecules in three dimensions. The PSF cross-sections of FIGS. 1A, 1B, and/or 1C show significant aberrations, mostly due to the tilt of the SLM and camera with respect to the optical axis. While these aberrations can be corrected with the SLM itself, the ability of the PR-enabled estimator to localize single-molecules with such strong aberrations is instructive and remarkable. During the experiments no significant anisotropic effects were noticed due to the rotational freedom of the fluorescent proteins. The system was observed to be essentially isoplanatic, but the method can be also used in shift or depth variant conditions.

The single-molecule localization performance compares favorably with recent 3D localization experiments in PALM/STORM. A rigorous comparison of the various experimental techniques is difficult because the available reports relate to different samples and fluorophores. Furthermore, 3D PALM/STORM reports do not always provide complete data (3D precision, number of detected photons, background noise level, axial range, etc.). Besides, many studies use isolated beads rather than single molecules to characterize the system's performance, which, while useful, provide favorable detection conditions with no background noise from other emitters, no auto-fluorescence, and limited aberrations. One way around this problem is to consider fundamental assessments of the performance limits, which have recently shown the advantages of engineered PSFs. Another informative approach is to compare actual experimental single-molecule performances based on quantitative measures of resolution and axial range as explained in what follows.

For the shot noise limiting case, neglecting for the moment background and pixilation noise, the localization precision follows the $1/\sqrt{N}$ scaling law. Hence, various embodiments can use the photon-normalized geometric mean precision, $C^{3D}=\sqrt{N^3}\sqrt[3]{\sigma_x\sigma_y\sigma_z}$, as a resolution metric compare 3D systems. According to this metric, the system demonstrated here achieves almost twice the precision of prior 3D PALM/STORM demonstrations using astigmatic] and bi-plane imaging (corresponding to ~5-8 times smaller minimum resolvable volume) with more than twice the depth range. It thus becomes closer to achieving the axial resolution of interferometric systems while providing one order of magnitude longer axial range with a much simpler system. It should be noted that the current DH-PSF experiment was performed with fluorescent proteins and over a long depth range, both of which negatively affect the signal to background noise ratio.

These results show that the integration of PSF engineering, photo activation-localization imaging, and optimal estimation provided by various embodiments of the present invention enables one order of magnitude improvement in resolution along each spatial direction when compared with classical fluorescence imaging, which in turns translates into three orders of magnitude improvement in the resolvable volume over a wide 3D field of view.

In conclusion, the optimal estimator, based on a (PR-enabled) MLE can be efficient in reaching the 3D localization performance limits with arbitrary PSFs tailored to match the conditions found in single molecule imaging. The rigorous PR interpolation of calibration data takes into account systematic errors caused by unknown and unavoidable 3D optical aberrations. The optimal 3D localization algorithm in conjunction with a DH-PSF shows the best 3D localization precision in PALM/STORM systems with an extended depth range, enabling a ~1000 fold improvement in resolvable volume with respect to classical fluorescence microscopy.

Additional Results

Figure 13:
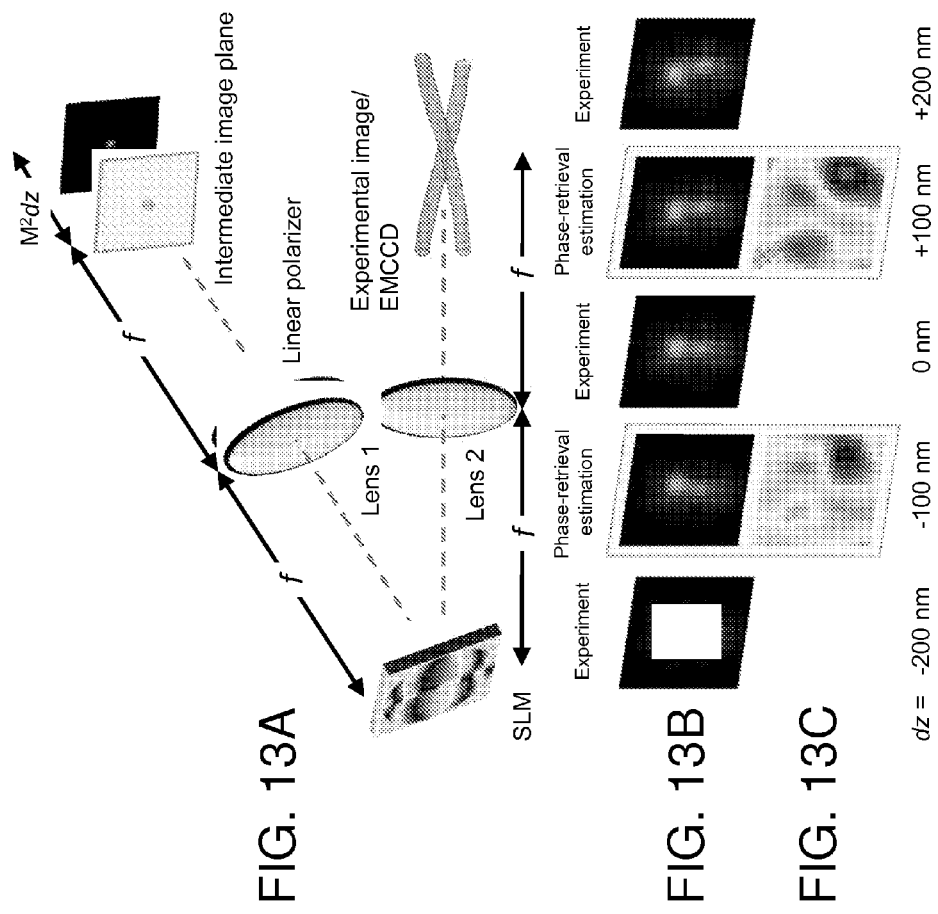
FIGS. 13A-13C illustrate a double-helix Point Spread Function (DH-PSF) microscope along with the intensity of a resulting complex field and a phase profile, in accordance with various embodiments.

In some embodiments, the estimator efficiency of the MLE may be simulated using an optical microscope with NA=1.3, M=91×, merely by way of example. A single molecule with monochromatic emission at λ=515 nm, for example, may be imaged using a DH-PSF microscope. The DH-PSF may be manifest as a pair of intense lobes that rotate about a center of mass as the object translates axially, as shown in FIGS. 13B and/or 13C. The DH-PSF may be sampled on the detector at ½ Nyquist with a 16 μm pixel pitch, for example. No background may need to be included and the number of photons emitted from the molecule may be varied to track estimator performance. Poisson noise may be considered the dominant noise process, consistent with experimental conditions.

In the embodiments shown in FIG. 13A, a DH-PSF microscope is provided that can be realized by appending a 4F optical stage to the intermediate image plane in accordance with various embodiments. FIG. 13A shows a geometry that may be use an on-axis hologram from the Spatial Light Modulator (SLM) to encode the DH-PSF. A linear polarizer may be used to reject light that is orthogonal to the active control polarization of the SLM. The extended shape of the DH-PSF in the imaging volume is shown in green. FIG. 13B shows an iterative phase retrieval algorithm that may use calibration images to estimate the complex field at any location. The intensity of the resulting complex field is shown here and smoothly follows the rotation rate and intensity modulation expected from the neighboring experimental images. FIG. 13C shows a phase profile returned from the iterative phase retrieval rotates with the intensity image.

Figure 14:
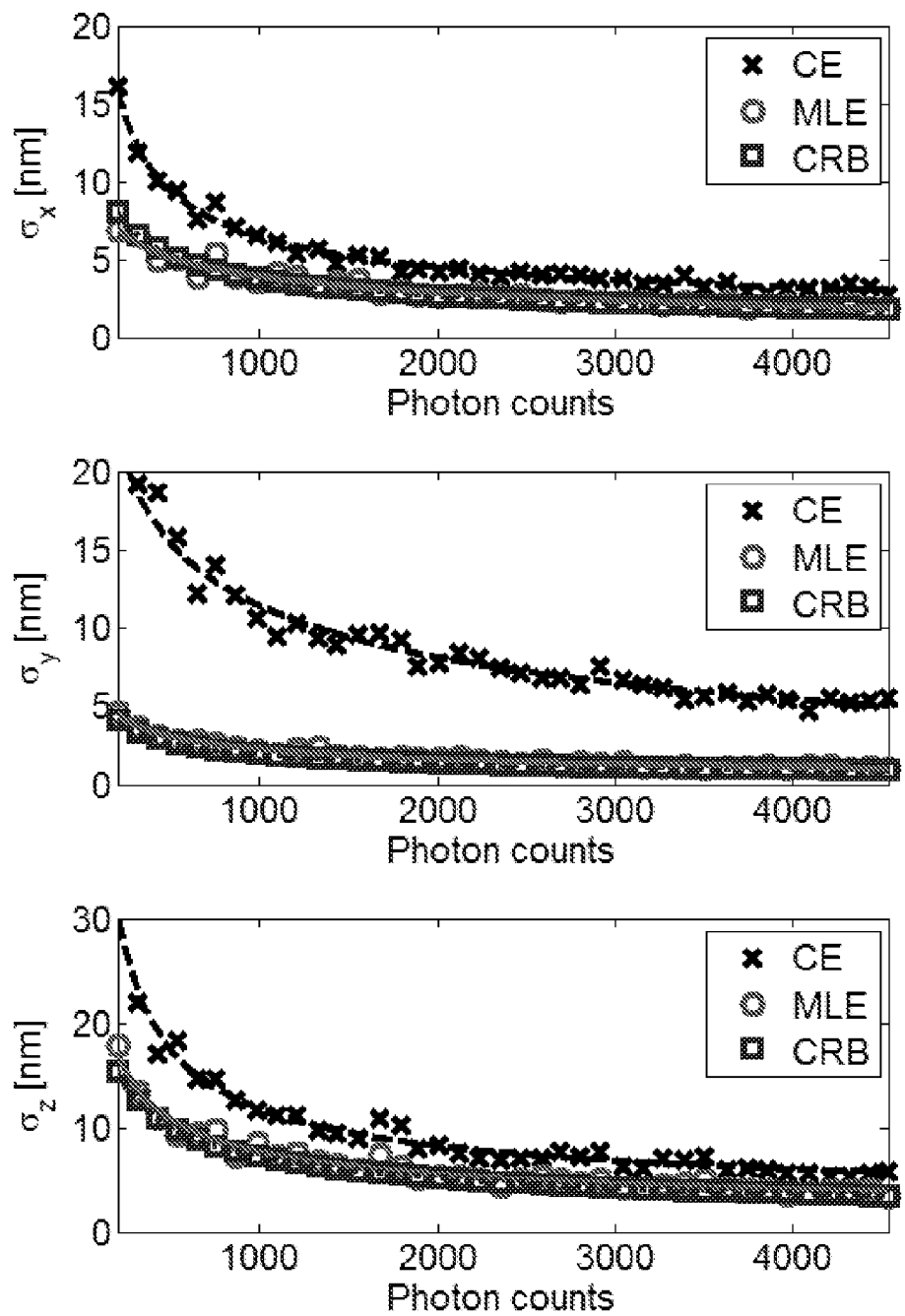
FIG. 14 provides graphs comparing estimator performance of an MLE to rotation angle estimator (AE) and Cramer-Rao Bound (CRB), in accordance with various embodiments of the present invention.

In FIG. 14, the MLE results for some embodiments are presented alongside a typical estimator using the rotation angle of the DH-PSF (AE) to estimate 3D position. In addition, the CRB may be given to provide a measure of efficiency, $$\varepsilon = \frac{\sigma_{est}}{\sigma_{CRB}}$$

—the ratio of the chosen estimator precision to that of the CRB. These results may demonstrate that the MLE approaches the CRB with efficiency $\epsilon_{MLE}(x,y,z)=(1.0\pm0.1, 1.2\pm0.1, 1.1\pm0.1)$ whereas the angle-based estimator is less efficient $\epsilon_{AE}(x,y,z)=(1.7\pm0.1, 5.8\pm0.1, 1.5\pm0.1)$, merely by way of example. This means that each estimate may be made within a reduced volume of uncertainty when using the MLE. As a result, the uncertainty ellipse $(V=4/3\pi\epsilon_x\epsilon_y\epsilon_z)$ may be reduced by 1×, merely by way of example, providing a visual interpretation of the increased efficiency of the PR-enable MLE approach.

FIG. 14 provides examples of estimator performance of an MLE, in accordance with various embodiments, that may be compared with a rotation angle estimator (AE) and Cramer-Rao Bound (CRB) as a function of photon counts. Regardless of the particular estimator, increasing the number of photons in the image may provide an increase in the estimator performance. The MLE may have a lower measurement error relative to the AE in all three dimensions and may be seen to closely track the fundamental lower limit, the CRB.

Merely by way of example, the following provides experimental demonstration using a DH-PSF in accordance with some embodiments that may be realized by appending a 4F Optical Signal Processing (OSP) configuration to the intermediate image plane behind the microscope objective and tube lens as shown in FIG. 13A. A diffractive element in the Fourier plane, here a Spatial Light Modulator (SLM), may encode the appropriate PSF. The result may be a convolution of the intermediate image with the DH-PSF.

In this experimental demonstration, calibration images were prepared using fluorescent beads to provide high SNR (40 nm wide, Invitrogen yellow-green carboxylate-modified FluoSpheres®). The images are taken in 100 nm axial intervals through a depth of 2.4 μm. The microscope objective was a 1.3NA Olympus with a magnification of M=91× using the paired tube lens. Two Fourier lenses of focal length f=250 mm were used with an appropriate aperture size at the phase mask. The Electron Multiplying (EM) CCD (e.g., And or iXon EM-CCD) digitizes the images with a pixel pitch of 16 um and quantum efficiency of 0.95 @ λ=515 nm. The phase retrieval algorithm uses three calibration images (n−1, n,n+1) in the algorithm to produce the images shown in FIGS. 13B and/or 13C. One skilled in the art will recognize that embodiments may involve other specifics.

A sample of PtK1 (Rat Kangaroo Kidney Epithelial) cells expressing PA-GFP-tubulin was examined with stochastically emitting fluorophores at 515 nm as molecule labels. The histograms in FIGS. 15A-15E compare estimator results of the AE and MLE on a series of 15 single molecule images. The average number of photons in the PSF per image was 1274+/−214.

Figures 15A, 15B, 15C, 15D, 15E:
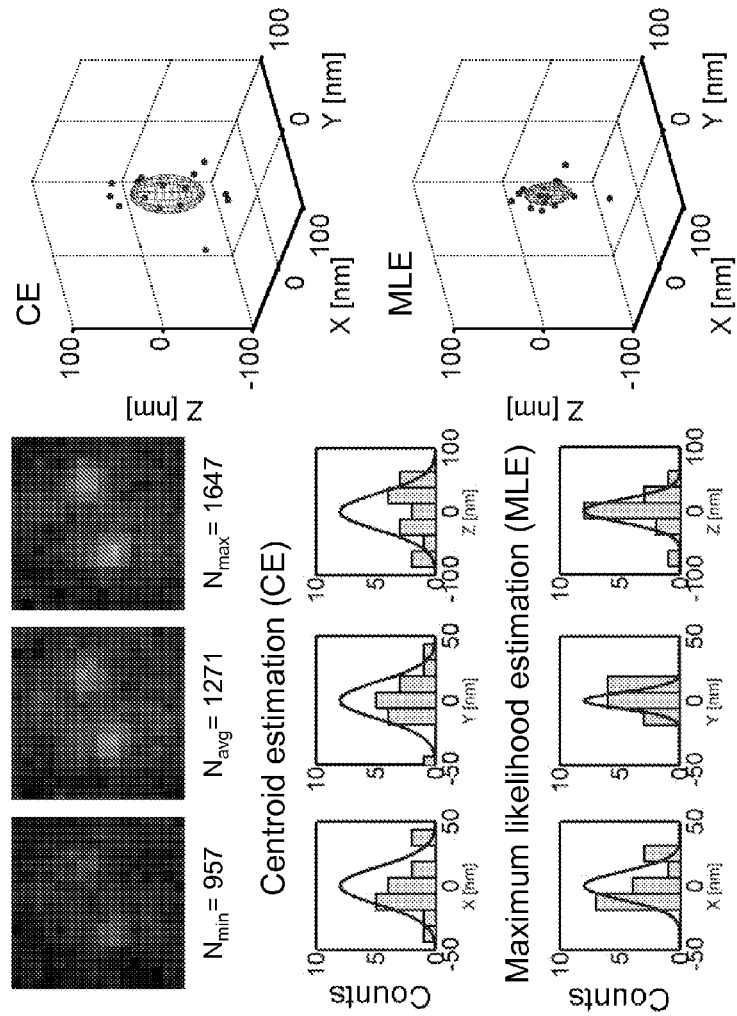
FIGS. 15A-15E provides experimental data, in accordance with various embodiments of the present invention.

FIGS. 15A-15E provide the following various experimental data. FIGS. 15A-15E provide experimental data taken from the 15 single molecule images, merely by way of example. The images may be representative of the fewest, average and most photons measured in the PSF. The average was 1274+/−214 photons. FIG. 15B provides histograms of the rotation angle estimator (AE) measurements normalized to the mean. The measurement precision was $\sigma_{ae}(X,Y,Z)=$ (20.7,20.4,40.7) nm. FIG. 15C provides histograms of a PR-enable MLE, in accordance with various embodiments, normalized to the mean. The measurement precision may be improved to $\sigma_{mle}(X,Y,Z)=(15.3,9.0,26.0)$ nm. FIG. 15D provides a volume scatter plot of the individual measurement using the AE. An uncertainty ellipsoid is given in red to visualize the degree of precision in the estimate. FIG. 15E provides a volume scatter plot using an MLE, in accordance with various embodiments with the uncertainty ellipse noticeably smaller, indicative of a superior estimator.

Merely by way of example, the precision of the 3D localization measurement using AE was $\sigma_{ae}(X,Y,Z)=(20.7, 20.4,40.7)$ nm while the MLE measurement exhibited a lower measurement error, $\sigma_{mle}(X,Y,Z)=(15.3,9.0,26.0)$ nm in all three dimensions. This may correspond to a reduction in the uncertainty ellipsoid volume by 4.8×, confirming the existence of a superior estimator in an experimental demonstration.

The PR-enabled MLE may be suitable in some embodiments for implementation on arbitrary optical systems and because of the calibration images, compensates for experimental aberrations. This may enable the pursuit of more complex PSFs with MLEs tailored to match the conditions found in single molecule imaging.

Furthermore, in some embodiments, methods may involve a phase retrieval algorithm assumed quasi-monochromatic emissions at 515 nm and a sampling of the coherent DH-PSF at 1.3× Nyquist (0.65× Nyquist incoherent PSF). The intensity constraint may be enforced by three images, the two nearest neighbors and the image related to the field of interest. In order to limit the propagation of errors, the MLE may choose the best fit from this collection of possible fields and then propagates from this axial position.

In some embodiments, an MLE estimator may use a Gaussian MLE. The background subtraction may use an image contouring technique which fits the background to disk profiles of 9 pixel diameter in some embodiments. Alternatively, the published background pixel count from the EM-CCD manufacturer may be used. The assumed quantum efficiency of the back-illuminated EM-CCD was 96.5% at 515 nm, in some embodiments.

In some embodiments, a centroid estimator may use the cubed power of intensity images for fitting. Not data interpolation of spatial intensity pattern was used. The rotation angle to distance calibration may be fitted using a spline interpolant.

Optical Coding Scheme

Spinning point spread functions can have characteristics relevant for the estimation of three dimensional object or particle location as well as imaging of objects located at different depth. The transverse position or rotation, size and shape, relative to a fiduciary, can provide the information necessary to localize in three dimensions. Without a fiduciary, the size and shape can be slowly varying which allows for in-focus 3D imaging. The slowly varying characteristic of the size and shape can provide a probing mechanism for volumetric sensing with improved signal performance.

Various embodiments of the present invention can use an optical coding scheme of three dimensional scenes imaged onto a digital device or projected into a volume. In accordance with some embodiments, the optical encoding can modify the PSF of the optical device to consist of a prominently intense peak which spins about an axis as it is propagated axially. For example, in an image capture device, the resulting image(s) may be post-processed to generate both a depth map and a restored image (i.e. without the effects of defocus). Alternatively, the PSF may be projected into a volume to functionally manipulate, trap, etc. matter in a fashion consistent with the shape.

Embodiments can include methods, systems, and devices which may be used to locate/localize objects in three dimensions for imaging, sensing and manipulation.

The point spread function of the optical implementation of various embodiments can have a pre-defined three dimensional shape with characteristics carrying high 3D Fisher Information due to the transverse shift of a pattern after axial propagation. The pattern may consist of one principle intensity peak which spins around an axis with propagation. The resulting optical modulation transfer function (MTF) may have minimal zeros as well as a higher average 2D bandwidth and real space and/or spatial frequency signal-to-noise ratio (SNR) to represent an improvement in optical system design throughout a volume of operation. In particular, the pattern may spin about an axis as the light propagates along the z dimension. The PSF may be generated via phase mask, amplitude mask, hologram, or diffractive optical element, merely by way of example. The image(s) may be used for precise object localization/sensing measurements as well as restoration of the original scene spatial frequency spectrum before band-limiting from aberrations including but not limited to defocus, spherical, etc. Estimation algorithms such as maximum likelihood estimators (MLE) or Bayesian methods for example may be used to globally/locally estimate the PSF encoded into the image of the object in order to return three dimensional coordinates of the object and/or restored images.

Figure 16:
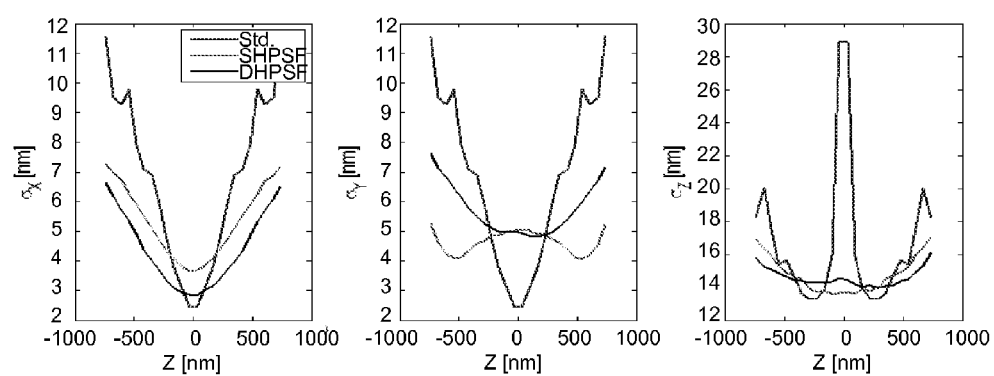
FIG. 16 provides graphs of the Cramer-Rao Lower Bound (CRLB) to the 3D localization (x,y,z) unbiased estimator variance for the standard (Std.) imaging camera with no additional functional encoding, the Single-Helix PSF which belongs to the class of spinning PSF's addressed herein, and the Double-Helix PSF which is an additional example of a spinning PSF.

FIG. 16 shows graphs of the Cramer-Rao Lower Bound (CRLB) to the 3D localization (x,y,z) unbiased estimator variance for the standard (Std.) imaging camera with no additional functional encoding, the Single-Helix PSF which belongs to the class of spinning PSFs addressed herein, and the Double-Helix PSF which is a more complicated example of a spinning PSF. The number of photons used in this analysis was equivalent regardless of optical system design. The spinning PSFs show, on average, enhanced and more uniform performance through the imaging volume.

Figure 17:
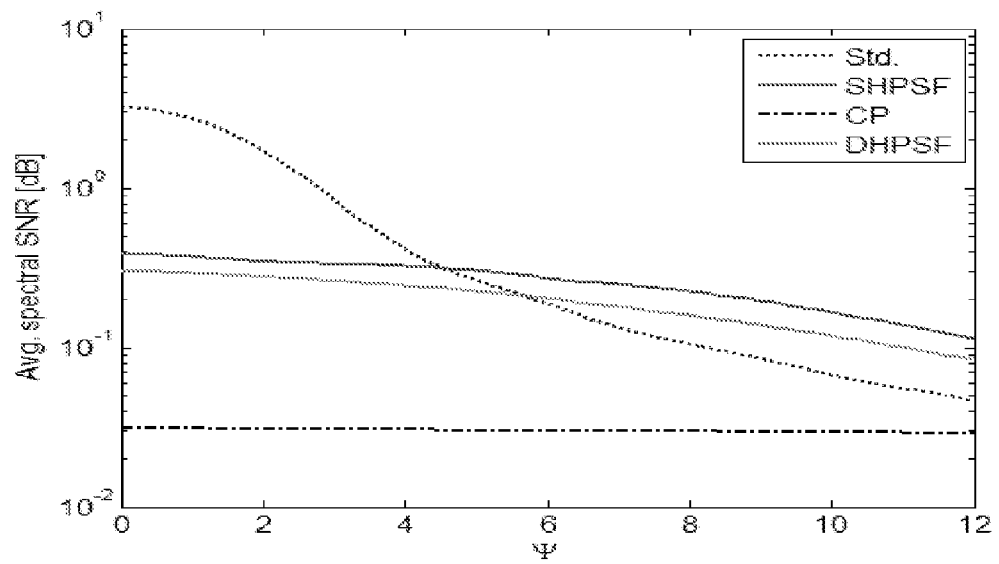
FIG. 17 provides a graph of spatial frequency domain SNR as a function of the defocus parameter $$\Psi(z) = -\frac{\pi}{\lambda}NA^2(z-f)$$

FIG. 17 shows a graph of the spatial frequency domain SNR as a function of the defocus parameter LP for multiple optical encoding techniques when imaging a point source object, for example. The standard (Std.) imaging camera is provided for a reference when no optical encoding is utilized. The cubic phase (CP) image camera (where a cubic phase profile is present in the pupil plane of the imager) serves as the standard for EDOF performance from prior art. The SH-PSF and DH-PSF both serve as examples of spinning PSFs. The SH-PSF provides the most uniform and best average SNR out of the options presented.

FIG. 18 show an example application using the spinning point spread function for extended depth of field. The scene consists of a bouquet, with flowers ranging in axial position such that the flowers out of focus are readily apparent in the middle (vertical axis), left (horizontal axis) region of the image. A spatially variant restoration algorithm was applied to the single-helix, spinning PSF image to provide the estimate of the original object as the image on the right. The white rectangle highlights a specific region of the image where defocus destroyed information on the left image but was restored in the spinning PSF image.

FIG. 19 shows an example embodiment of a spinning PSF coding mask which may be placed in the pupil plane for example. The design utilizes phase modulation to reduce the absorption of light which would be responsible for limiting the throughput of the optical design.

FIG. 20 shows an example embodiment of spinning PSF coding masks. The design utilizes phase modulation to vary the operational depth of field of the system. Alternative nomenclature for this embodiment of spiral point spread function is Single Helix PSF (SH-PSF).

FIG. 21A shows an exemplary embodiment of MTFs as a function of defocus for the previous art in extended depth of field. FIG. 21B illustrates an example of MTFs as a function of defocus for the spiral PSF.

FIG. 22 illustrates a definition of spiral point spread function that can be used in accordance with some embodiments of the present invention. As illustrated in FIG. 22, the transverse angular orientation $\phi$ monotonically increases along the z axis. The radial coordinate of the spiral PSF slowly varies along the z axis according to $\epsilon(z)$.

Exemplary Computer System Overview

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 23 is an example of a computer system 2300 with which embodiments of the present invention may be utilized. According to the present example, the computer system includes a bus 2305, at least one processor 2310, at least one communication port 2315, a main memory 2320, a removable storage media 2325, a read only memory 2330, and a mass storage 2335.

Processor(s) 2310 can be any known processor, such as, but not limited to, in Intel® Itanium® or Itanium 2® processor(s), or AMD® Opteron® or Athlon MP® processor(s), or Motorola® lines of processors. Communication port(s) 2315 can be any of an RS-232 port for use with a modem based dialup connection, a 10/100 Ethernet port, or a Gigabit port using copper or fiber. Communication port(s) 2315 may be chosen depending on a network such as a Local Area Network (LAN), Wide Area Network (WAN), or any network to which the computer system 2300 connects.

Main memory 2320 can be Random Access Memory (RAM), or any other dynamic storage device(s) commonly known in the art. Read only memory 2330 can be any static storage device(s) such as Programmable Read Only Memory (PROM) chips for storing static information such as instructions for processor 2310.

Mass storage 2335 can be used to store information and instructions. For example, hard disks such as the Adaptec® family of SCSI drives, an optical disc, an array of disks such as RAID, such as the Adaptec family of RAID drives, or any other mass storage devices may be used.

Bus 2305 communicatively couples processor(s) 2310 with the other memory, storage and communication blocks. Bus 2305 can be a PCI/PCI-X or SCSI based system bus depending on the storage devices used.

Removable storage media 2325 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

In conclusion, the present invention provides novel systems, methods and arrangements for optimal 3D localization procedures in photo-activation localization microscopy. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. An imaging system for three dimensional localization, imaging, and/or tracking of an object, the imaging system comprising:
an optical system comprising an objective lens, wherein the optical system produces a spatially varying phase difference imposed among different components of the light coming through different parts of the objective lens to generate a three dimensional point spread function image, wherein a maximum of the point spread function describes a curve in three-dimensional space;
at least one sensor array configured to receive one or more images of an object through the optical system; and
a processing module configured to provide one or more of the following functions imaging of the object, axial ranging of the object, a three dimensional estimate of a position of the object, and tracking of the object.

2. The imaging system according to claim 1, wherein the optical system includes multiple channels that each generate a different three dimensional point spread function.

3. The imaging system according to claim 1, wherein the maximum of the point spread function describes a curve in three-dimensional space that turns around an axis with a varying offset from the axis.

4. The imaging system according to claim 1, wherein the maximum of the point spread function describes a helix in three-dimensional space with varying offset and pitch.

5. The imaging system according to claim 1, wherein the maximum of the point spread function describes a curve in three-dimensional space that is similar to a helix.

6. The imaging system according to claim 1, wherein the maximum of the point spread function describes a curve in three-dimensional space with varying offset from an axis.

7. The imaging system according to claim 1, wherein the maximum of the point spread function describes a curve in three-dimensional space with varying offset and/or varying pitch.

8. The imaging system according to claim 7, wherein the point spread function describes a helical curve.

9. The imaging system according to claim 1, wherein the point spread function describes a helical curve when one or both of the axis and offset are constant.

10. The imaging system according to claim 1, wherein the processing module is further configured to produce a spatially varying phase delay with a refractive, reflective, or diffractive optical element.

11. The imaging system according to claim 1, wherein the processing module is further configured to produce either or both an extended depth of field of the object and a depth map of the object.

12. The imaging system according to claim 1, wherein the processing module is configured to provide one or more of the following functions imaging of the object, axial ranging of the object, a three dimensional estimate of a position of the object, and tracking of the object.

13. The imaging system according to claim 1, further comprising a point spread function that produces a modulation transfer function with minimal zeros.

14. The imaging system according to claim 1, wherein the processing module is further configured to wide-field image.

15. The imaging system according to claim 1, wherein the optical system includes at least portions of a standard microscope.

16. A method comprising:
providing one or more optical elements, wherein in at least one of the one or more optical elements provides phase modulation;

passing light through at least one of the one or more optical elements toward an object;

detecting light from the object through at least one of the one or more optical elements with a light detection system, modifying the light received at the light detection system to create a point spread function at an optical detection plane, wherein a maximum of the point spread function describes a curve in three-dimensional space; and estimating a distance to the object using the point spread function.

17. The method according to claim 16, wherein at least one of the one or more optical elements comprises one or more optical elements selected from the list consisting of a lens, phase mask, a hologram, spatial light modulator, and a non-flat reflective surface.

18. The method according to claim 16, further comprising tracking the object.

19. The method according to claim 16, further comprising estimating a range to the object.

* * * * *